United States Patent [19] [11] Patent Number: 4,921,396
Asakawa et al. [45] Date of Patent: May 1, 1990

[54] SUPPORTING DEVICE

[75] Inventors: Kazuo Asakawa; Fumiaki Akiya, both of Kawasaki; Fumio Tabata, Yokohama, all of Japan

[73] Assignee: Fujitsu Limited, Kawasaki, Japan

[21] Appl. No.: 158,041

[22] Filed: Feb. 16, 1988

Related U.S. Application Data

[63] Continuation of Ser. No. 876,663, Jun. 20, 1986, abandoned, which is a continuation of Ser. No. 533,976, Sep. 20, 1983, abandoned.

[30] Foreign Application Priority Data

Sep. 21, 1982 [JP] Japan ................................. 57-163074
Sep. 21, 1982 [JP] Japan ................................. 57-163067
Sep. 24, 1982 [JP] Japan ................................. 57-164854
Sep. 28, 1982 [JP] Japan ................................. 57-167509

[51] Int. Cl.$^5$ ............................................. B25J 17/02
[52] U.S. Cl. ................................. 414/751; 73/862.04; 248/550; 267/160; 310/13; 318/568.11; 318/568.16; 318/568.21; 318/646; 403/27; 403/220; 403/291; 901/29; 901/45
[58] Field of Search ........................ 414/735, 749, 751; 901/45, 29, 28; 248/550, 566; 310/12, 13; 318/153, 488, 568, 646, 568.11, 568.16, 568.21, 568.22; 73/862.04–862.06; 267/158, 160, 181, 47, 175, 177; 403/27, 220, 291

[56] References Cited

U.S. PATENT DOCUMENTS 3,727,900 4/1973 Casey ................................. 267/160
3,873,077 3/1985 Jorn ................................. 267/152
3,984,006 10/1976 Takeyasu et al. ................. 901/45 X
4,129,290 12/1978 Popper ............................. 267/160
4,168,840 9/1979 Graham ........................... 267/64.16
4,179,783 12/1979 Inoyama et al. ................... 901/45 X
4,364,707 12/1982 Ott ..................................... 901/40 X
4,468,739 8/1984 Woods et al. ..................... 267/64.16
4,478,089 10/1984 Aviles et al. ..................... 73/862.04

FOREIGN PATENT DOCUMENTS 0015618 9/1980 European Pat. Off. .
2358498 7/1974 Fed. Rep. of Germany .
367186 10/1981 Fed. Rep. of Germany .
605050 9/1978 Switzerland .

OTHER PUBLICATIONS

European Search Report (English translation), Vienna, 12-06-84.

Primary Examiner—Robert J. Spar
Assistant Examiner—Donald W. Underwood
Attorney, Agent, or Firm—Staas & Halsey

[57] ABSTRACT

A supporting device including a first member which supports a springy means for resiliently supporting a second member. The supporting device includes a detection for detecting displacements of the springy with respect to the first member in accordance with the movement of the second member and a biasing which applies a force to the springy from the same direction as or from a direction opposite to that of the displacement for changing the elasticity of the springy in accordance with the movement of the second member.

34 Claims, 42 Drawing Sheets

Fig. 15
Fig. 16
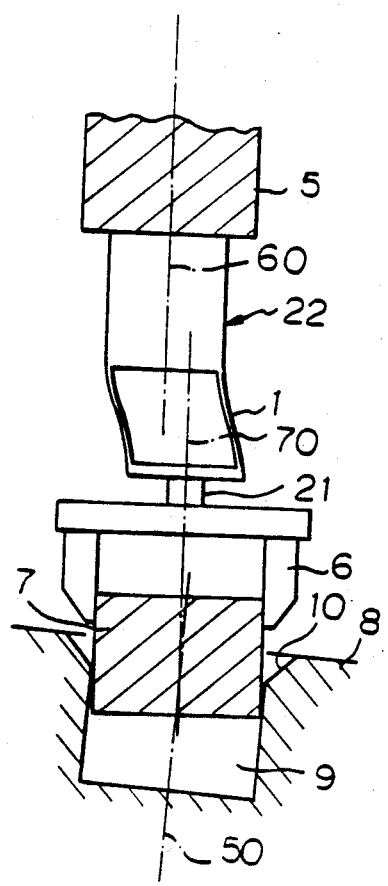
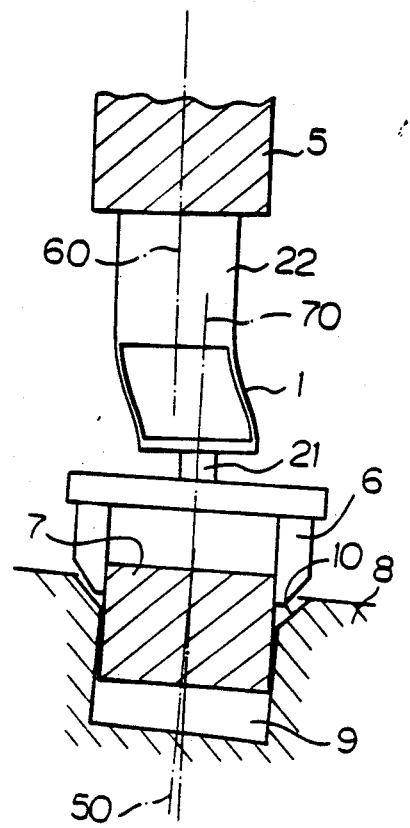

SIGNAL CONTROL (CPU)

SUPPORTING DEVICE

This is a continuation of co-pending application Ser. No. 876,663 filed on Jun. 20, 1986, now abandoned, which is a continuation of Ser. No. 533,976 filed Sept. 20, 1983, now abandoned.

BACKGROUND OF THE INVENTION

1. Field of the Invention

The present invention relates to a supporting device for supporting or holding an article with the aid of a springy means. More particularly, it relates to a supporting device comprising a springy means in which the apparent spring force can be changed in accordance with the movement or situation of the article to be supported by applying a force to the springy means. The present invention is especially useful when applied to a connection means located between an arm and a hand of an industrial robot.

2. Description of the Prior Art

A supporting device comprising a springy means in which the springy force can be varied in response to the force applied to the article to be supported, is required in various industrial fields. For example, a supporting device is used in a paper feed apparatus. Paper to be fed is pressed onto a paper feeding passage by a spring so as to avoid scattering. The springy force of the supporting device of the prior art is constant irrespective of the kind or number of the paper to be fed. If a stiff spring is chosen so as to deal with thick and hard paper or corrugated paper, thin paper may be torn by the spring. On the other hand, if a soft spring is chosen so as to deal with thin paper, the pressing force thereof is not sufficient for avoiding scattering the thick papers. Therefore, the kind of the paper is limited in accordance with the springy force of the springy means used in the paper feed apparatus, or otherwise the entire springy means should be exchanged to deal with another kind of paper.

A supporting device comprising a springy means is also used in robot for manufacturing magnetic heads or record player arms. The assembling operation of the magnetic head or record player arm should be carried out accurately and conducted by a weak force so as to avoid damage of the arm or head, which necessities an expensive control means of high accuracy.

Industrial robots are disposed along an assembly line for the automatic production of various articles. For example, an industrial robot is used to insert a rod member into a hole which has a clearance on the order of several microns. In such an insertion operation, the position of the rod member with respect to the hole must be precisely adjusted before insertion of the rod member into the hole so as to achieve smooth insertion thereof and so as to prevent damaging of the rod member and the hole. Therefore, a robot which can easily and precisely position a rod member to be handled in the above-mentioned insertion operation is required.

An industrial robot is used in order to automatically produce articles with a high reliability and at a high speed, which production requires a precise position-control system. The assembling of products with a high accuracy cannot be achieved simply by increasing the accuracy of positioning of the robot itself. An important factor is the ability to accurately adjust relative position between the members to be assembled. This is especially important in a process where a rod member is inserted into a hole of a close clearance of several microns. The robot used in the insertion operation comprises an arm and a hand for gripping the rod member attached to the end of the arm. The rod member is conveyed to a position above the hole by the horizontal movement of the arm. Then the rod member is inserted into the hole by the vertical movement of the arm. The hand of the conventional robot is rigidly secured to the arm end. Therefore, it is impossible to insert the rod member into the hole unless the rod member is precisely aligned with the hole. If the rod member is misaligned with the hole, the rod member and the member to receive the rod member are damaged by the vertical movement of the robot arm for insertion of the rod member. In order to prevent such damaging of the members, a control means for precisely controlling the position of the robot arm is necessary. However, this control means increases the cost of the robot.

There has been proposed a compliance means, comprising a springy means such as a leaf spring or a coil spring, so as to achieve smooth insertion of the rod member into the hole by applying such compliance means to the wrist portion between the hand and the arm of the robot. Such compliance means compensates for the misalignment between the rod member and the hole. If, in a robot having a wrist structure which comprises such a compliance means, the compliance of the wrist is increased so as to increase the compensation for misalignment of the rod member with respect to the hole, the stiffness of the wrist portion for insertion of the rod member into the hole is weakened, with the result that a sufficient insertion force cannot be generated. The large compliance of the wrist portion also causes the rod member grasped by the robot hand to vibrate when the movement of the robot arm is started and stopped. Therefore, the robot cannot be operated at a high speed.

An industrial robot achieving the above mentioned insertion operation and equipped with the compliance device located between the wrist and the hand is also used in the process of manufacturing magnetic discs.

As is illustrated in FIG. 60, a magnetic disc 401 comprises a flat ring plate substrate 402 of aluminum, on which a magnetic layer 403 is formed as a recording medium by a coating method or a sputtering method, the inner periphery 404 of the magnetic disc 401 being uncoated and exposing the aluminum substrate 402. The magnetic disc 401 is assembled with a spindle which is inserted into an opening 420 of the magnetic disc 401 so as to constitute a magnetic disc device. During the process of assembling the magnetic disc device, the magnetic layer 403 of the magnetic disc 401 must not be touched so as to prevent magnetic or mechanical damaging of the magnetic layer 403 and contamination of the disc surface with finger prints or dust.

A conventional hand structure of the robot for handling a magnetic disc is illustrated in FIG. 61. A hand 406 is attached to the end of an arm 405. The hand 406 comprises fingers 406a. Several pieces 407 are provided at the end of the finger 406a. The outer periphery of the magnetic disc 401 is received and held in V-shaped grooves (not shown) in each piece 407 of the finger 406a. This type of conventional hand of the robot is large and heavy, with the result that high speed control cannot be easily achieved. Also, the magnetic disc 401 and the hand 406 may be damaged if the magnetic disc 401 is misaligned with the spindle (not shown) or if the magnetic disc 401 is inclined with respect to the spindle when the spindle is inserted into the opening 420 of the magnetic disc 401. Therefore, the conventional robot necessitates a high accuracy control means for controlling the position and angle of the magnetic disc 401 with respect to the spindle.

SUMMARY OF THE INVENTION

The present invention obviates the above-mentioned drawbacks of the prior art and provides a supporting device which makes it possible to vary the springy force thereof in response to the movement or situation of the article to be supported by controlling the displacement of the springy means thereof in response to the force applied to the article.

A purpose of the present invention is to provide a supporting device which comprises a compliance means for compensating for misalignment of a member supported by the device with respect to a hole into which the member is to be inserted. The compliance, or elasticity, of the compliance means is variable so that the compliance (i.e., amount of movement) can be decreased when the member is conveyed, thereby preventing vibration of the member, and so that the compliance can be increased when the member is inserted into the hole, thereby achieving smooth insertion.

Another purpose of the present invention is to provide a supporting device which makes it possible to carry out the insertion operation easily and reliably without using a high accuracy position-control means.

A further purpose of the present invention is to provide a supporting device which is small, of a simple construction, can reliably hold an article, is especially suitable for holding a magnetic disc, and makes it possible to carry out a reliable assembling operation by automatically compensating for the misalignment and inclination of the article to be assembled with respect to the member.

In accordance with the present invention there is provided a supporting device comprising a first member which supports a springy means for resiliently supporting a second member, detection means for detecting displacement of the springy means with respect to the first member in accordance with the movement of the second member, and biasing means which applies a force to the springy means from the same direction as or from a direction opposite to that of the displacement, for changing the elasticity of the springy means in accordance with the movement of the second member.

Also in accordance with the present invention, there is provided a supporting device comprising a first member which supports a springy means for resiliently supporting a second member, the springy means comprising a first pair of parallel leaf springs, an end of which is connected to the first member, and a second pair of parallel leaf springs, an end of which is connected to the second member, the other end of the first pair of leaf springs and the other end of the second pair of leaf springs being interconnected in such a manner that the direction of displacement of the first pair of leaf springs with respect to the first member is perpendicular to the direction of displacement of the second pair of leaf springs with respect to the first member.

Further, in accordance with the present invention, there is provided a supporting device comprising a first member which supports a springy means for resiliently supporting a second member, the springy means comprising: a first pair of parallel leaf springs, an end of which is connected to the first member; a second pair of parallel leaf springs, an end of which is connected to the second member, the other end of the first pair of leaf springs and the other end of the second pair of leaf springs being interconnected in such a manner that the direction of displacement of the first pair of leaf springs with respect to the first member is perpendicular to the direction of displacement of the second pair of leaf springs with respect to the first member; and a cross-shaped leaf spring (diaphragm) which is disposed at the connecting portion between the springy means and the first or second member and which permits the second member to incline with respect to the first member and shift the second member with respect to the first member in a direction perpendicular to the direction of displacement of the first and second pair of leaf springs.

BRIEF DESCRIPTION OF THE DRAWINGS

FIGS. 13 to 16 respectively show the insertion operation of the robot of the present invention provided with the compliance means of FIG. 12, in series;

DESCRIPTION OF THE PREFERRED EMBODIMENTS

Figure 1:
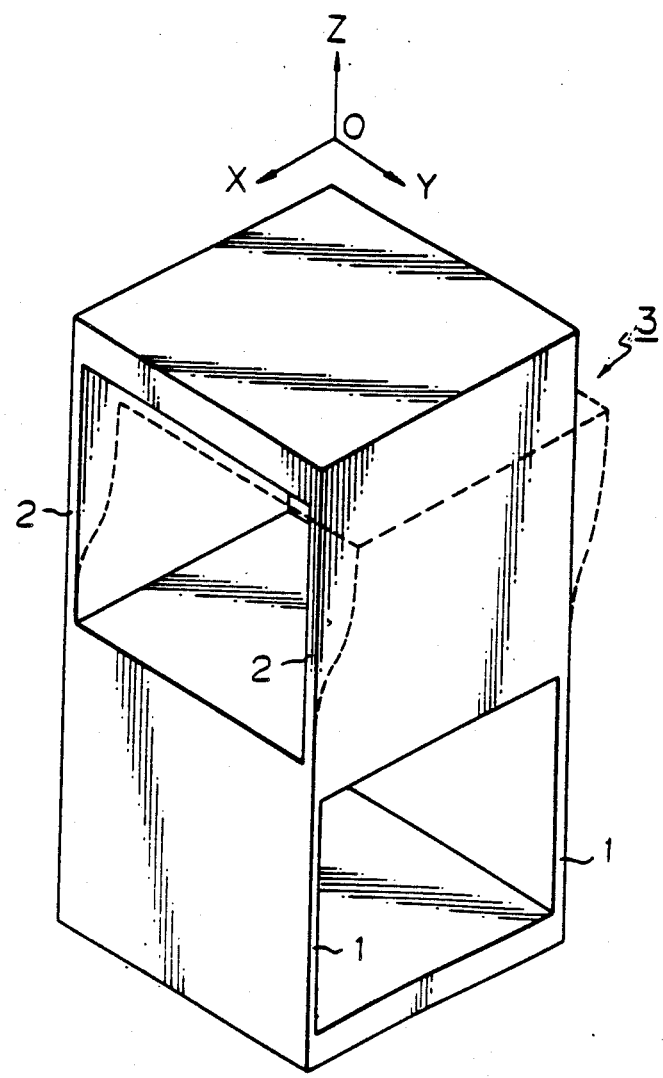
FIG. 1 is a perspective view of a mechanical compliance means comprising a parallel leaf spring assembly according to the present invention.

FIG. 1 is a perspective view of an example of a mechanical compliance means comprising a parallel leaf spring assembly according to the present invention. The compliance means comprises a parallel leaf spring assembly 3 which comprises a first pair of parallel leaf springs 1 which are movable only in the direction X and a second pair of parallel leaf springs 2 which are movable in only the direction Y, perpendicular to the direction X. Each pair of parallel leaf springs 1 and 2 comprises two sheets of leaf springs disposed parallel to and facing each other. For example, if a force is applied to the parallel leaf spring assembly 3 from the direction Y, the second pair of parallel leaf springs 2 deforms and moves in the direction Y, as is illustrated by the broken lines in FIG. 1.

Figure 2:
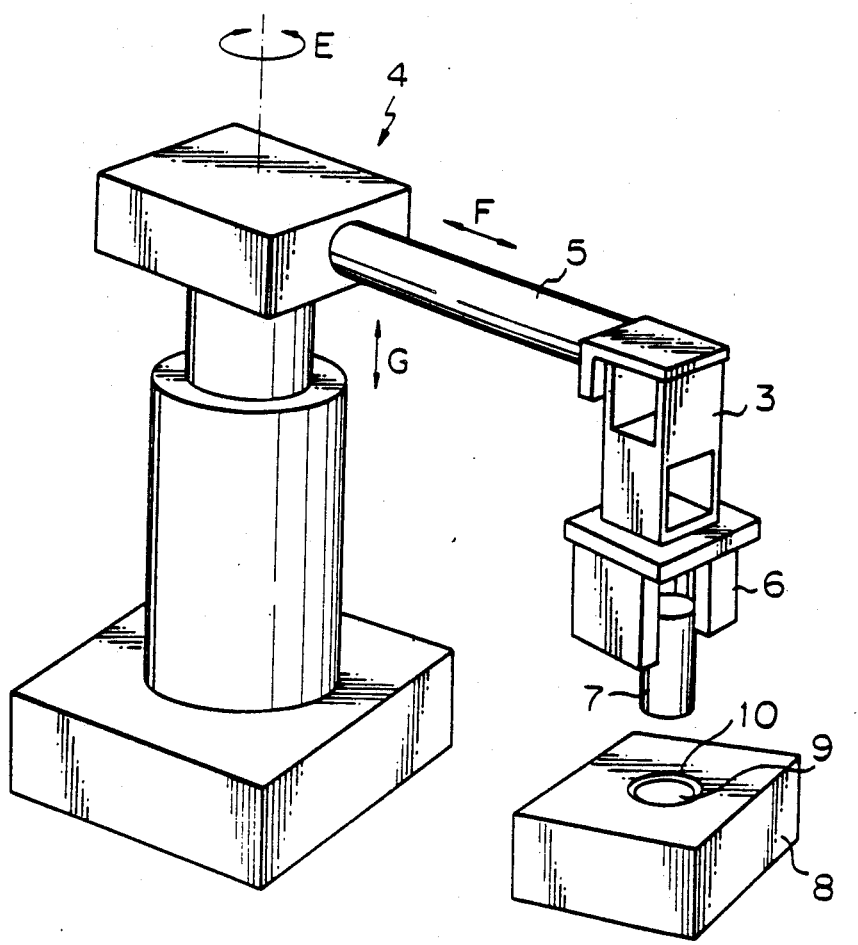
FIG. 2 is a perspective view of a robot comprising a parallel leaf spring assembly according to the present invention.
Figure 3:
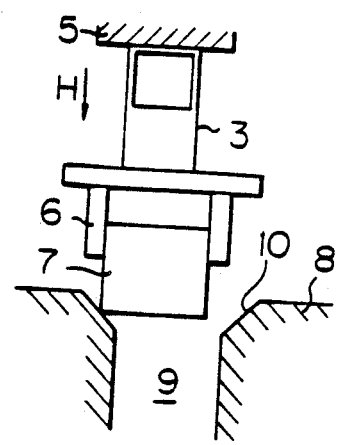
FIGS. 3 and 4 respectively show an insertion operation of the robot according to the present invention, in series.
Figure 4:
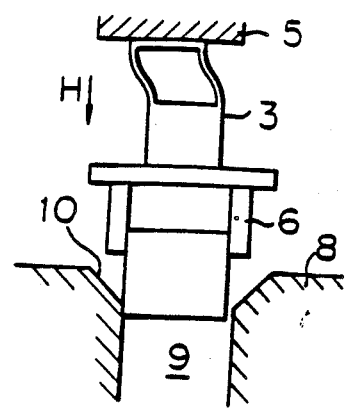

A robot 4 provided with the above-mentioned parallel leaf spring assembly 3 is illustrated in FIG. 2. The parallel leaf spring assembly 3 is secured to an end of an arm 5 of the robot 4. A hand 6 is attached to the lower end of the parallel leaf spring assembly 3. The arm 5 can be rotated in a forward direction and in a reverse direction, as is shown by the arrows E, and can be extended and retracted, as is shown by the arrows F. The arm 5 can also be shifted vertically, as is shown by the arrows G. A cylindrical rod member 7 is picked up and held by the hand 6 at a predetermined station (not shown) and is conveyed to a position above a hole 9 of a block 8. Then the rod member 7 is inserted into the hole 9 by a downward movement of the arm 5. The inlet edge of the hole 9 is chamfered so as to form an inclined surface 10. If the rod member 7 is misaligned with the hole 9 within the range of the chamfer 10, the rod member 7 abuts against the chamfer 10 when it is lowered, as is illustrated in FIG. 3. At this point, horizontal force components in the direction X and the direction Y are generated in accordance with the vertical insertion force H. Therefore, the parallel leaf spring assembly 3 is deformed and moved in the direction X and the direction Y, as is illustrated in FIG. 4, so that the rod member 7 is inserted into the hole 9, sliding downward along the chamfer 10.

The positional control of the arm 5, in response to displacement of the parallel leaf spring assembly 3, is described hereinafter.

Figures 5, 6:
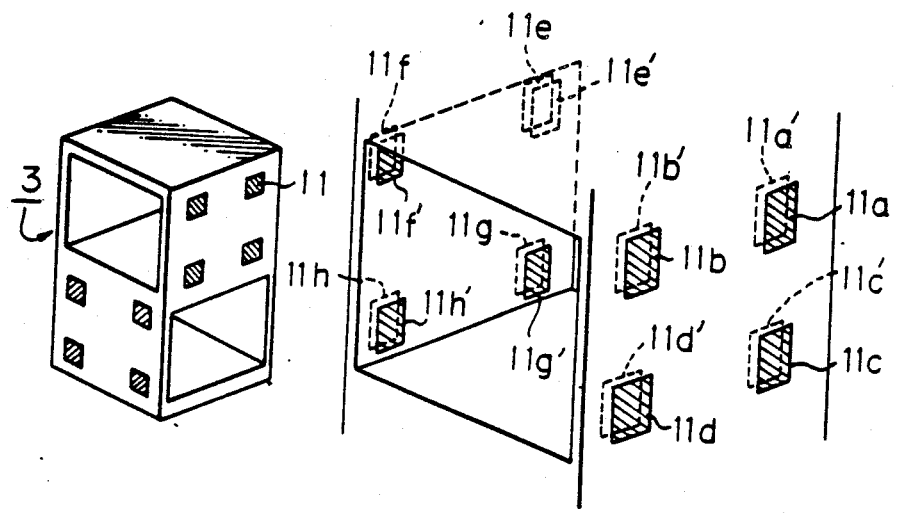
FIG. 5 is a perspective view of a parallel leaf spring assembly showing an arrangement of strain gauges attached thereon, according to the present invention.
FIG. 6 is a perspective view of a parallel leaf spring assembly showing another arrangement of strain gauges attached thereon, according to the present invention.

Strain gauges 11 are attached to each leaf spring of the parallel leaf spring assembly 3, as is illustrated in FIG. 5. The moment due to deformation of the leaf spring when a force is applied thereto is minimum at the center thereof and maximum at the ends thereof. Therefore, it is desirable to attach the strain gauges 11 to the upper and the lower ends of each leaf spring. In FIG. 5, the strain gauges 11 are attached to the four corners of each leaf spring.

Four strain gauges may be attached to the rear surface of each leaf spring in addition to the four strain gauges attached to the front surface thereof, as is illustrated in FIG. 6. Strain gauges 11a to 11h are attached to the front surface of each leaf spring, and strain gauges 11a' to 11h' are attached to the rear surface of each leaf spring and correspond to the strain gauges 11a to 11h attached to the front surface. The strain gauges are arranged in such a manner that the strain value detected by a strain gauge attached to the front surface of one of the pair of leaf springs is the same as that detected by the strain gauge attached to the rear surface of the other of the pair of leaf springs at a position which corresponds to that of the former strain gauge. For example, the strain value detected by the strain gauge 11a is equal to that detected by the strain gauge 11e', and the strain value detected by the strain gauge 11f is equal to that detected by the strain gauge 11b'. The force components which act upon the parallel leaf spring assembly can be detected on the basis of the output of the strain gauges. The force components in the direction X and the direction Y correspond to the displacement of the parallel leaf spring assembly in the direction X and the direction Y, respectively. Therefore, the displacement of the parallel leaf spring assembly in the direction X and the direction Y can be determined by the output of the strain gauges.

Figure 7:
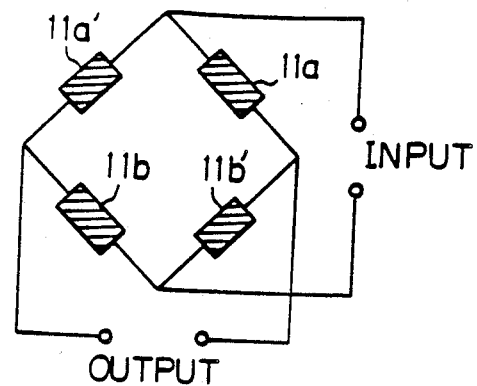
FIGS. 7 to 9 are diagrams of bridge circuits comprising strain gauges, each diagram showing a different bridge circuit.
Figure 8:
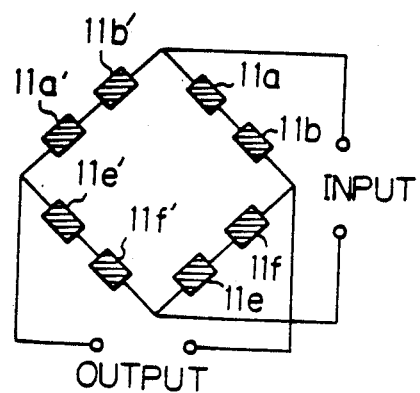
Figure 9:
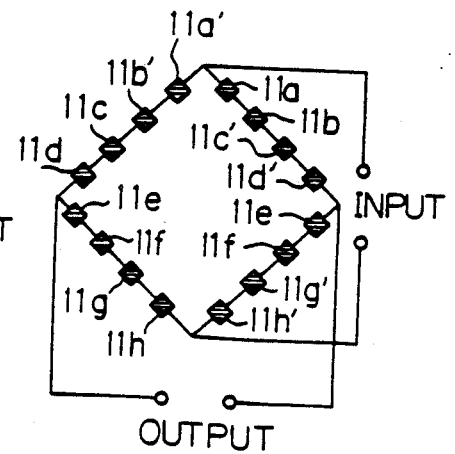

Examples of a bridge circuit for obtaining an output in response to a change of resistance of the strain gauges are illustrated in FIGS. 7 to 9. FIGS. 7, 8, and 9 are bridge circuits using four, eight, and sixteen strain gauges, respectively. FIG. 7 shows a bridge circuit for obtaining an output in response to a change of resistance of the minimum number of the strain gauges. In this case, two pairs of strain gauges (11a/11a' and 11b/11b') are used. It is desirable that the number of strain gauges be increased since the change of resistance of each strain gauge accumulates, and nonuniformity of the output of each strain gauge due to a temperature difference in different places is compensated for, thereby increasing the reliability of detection of the strain value by the strain gauges.

Figure 10:
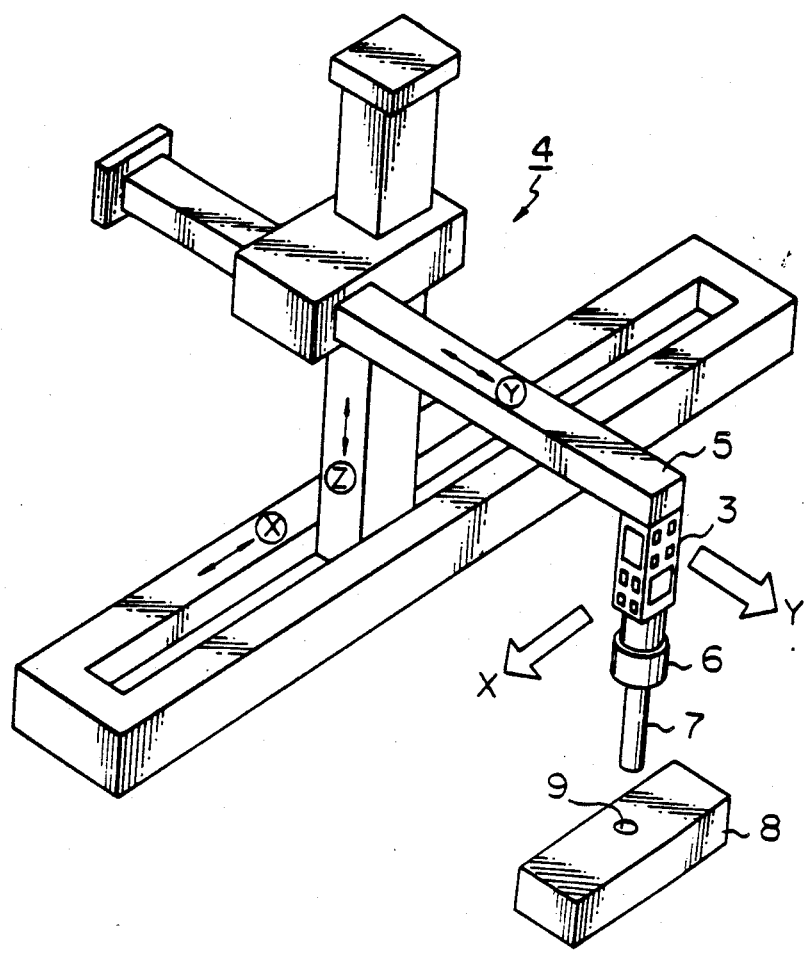
FIG. 10 is a perspective view of a robot comprising a parallel leaf spring assembly provided with strain gauges according to the present invention.

FIG. 10 is a perspective view of a robot 4 whose arm 5 can be moved in the direction X, the direction Y, and the direction Z. The robot 4 comprises the parallel leaf spring assembly 3 to which strain gauges are attached.

Figure 11:
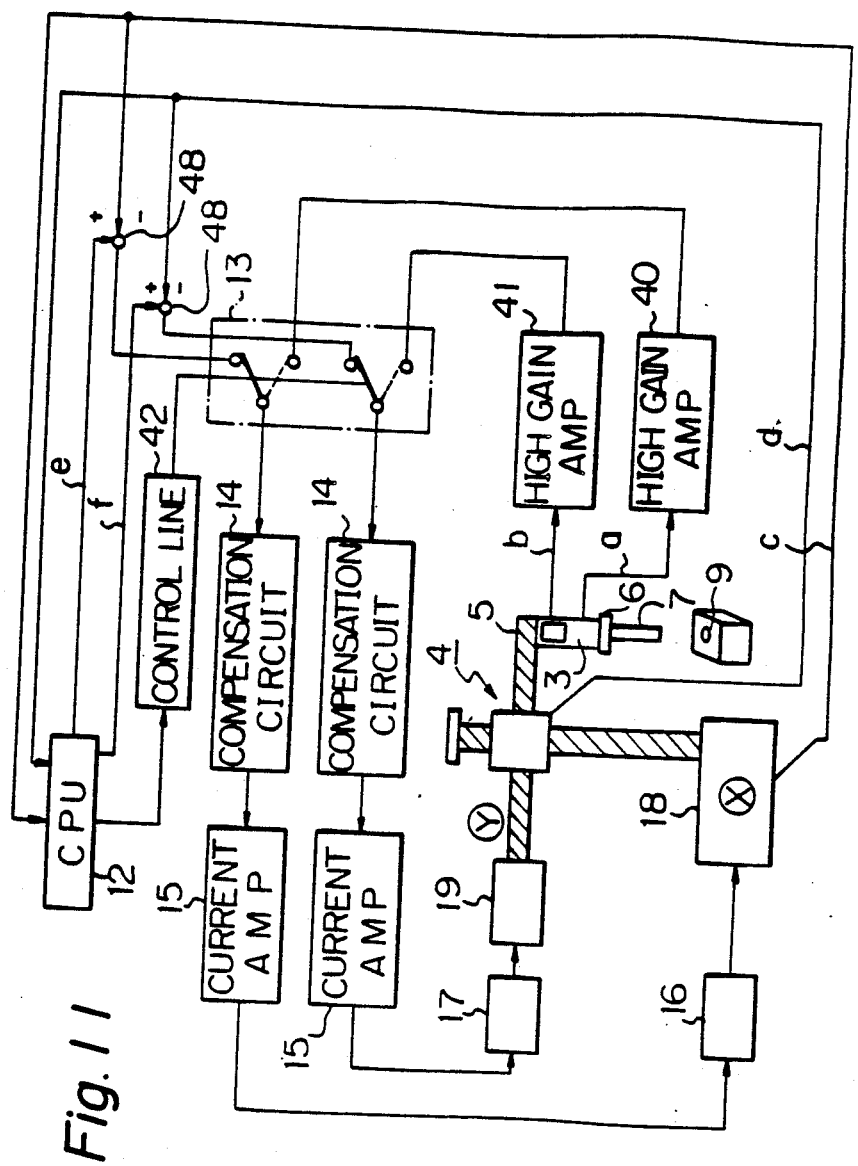
FIG. 11 is a control circuit diagram of the robot of FIG. 10.

FIG. 11 is a diagram of a circuit for controlling the position of the arm 5 in the direction X and the direction Y by using the strain gauges. The arm 5 is moved to a predetermined position by a positioning signal so that the rod member 7 held by the hand 6 is positioned above the hole 9 of the block 8. Then the operation of inserting the rod member 7 into the hole 9 is carried out by the robot 4. If the parallel leaf spring assembly 3 is moved with respect to the arm 5 in the direction X and the direction Y in the insertion operation, in which the arm 5 is moved in the direction Z, the displacement of the parallel leaf spring assembly 3 in the direction X and the direction Y is detected by the strain gauges, as was previously mentioned. The strain gauges generate signals a and b in response to the displacement of the parallel leaf spring assembly 3 in the direction X and the direction Y, respectively. The signals a and b are amplified by amplifiers 40 and 41, respectively, for enhancing the gain of the signals and are introduced into compensation circuits 14 via a switch means 13, the contacts of which are connected as is illustrated by the broken lines. The compensation circuit 14 compensates for the positional error of the arm. Then the signals a and b are introduced into a direction-X controller 16 and a direction-Y controller 17, respectively, via current amplifiers 15. The direction-X controller 16 carries out feedback control of the arm 5 by actuating a direction-X actuator 18 so that the displacement of the parallel leaf spring assembly 3 in the direction X is rendered zero. Also, the direction-Y controller 17 carries out feedback control of the arm 5 by actuating a direction-Y actuator 19 so that the displacement of the parallel leaf spring assembly 3 in the direction Y is rendered zero. The signals a and b may be used for compensation of the position of the arm 5 in the preceding operation of inserting a new rod member into a hole of a new block by altering the original positioning signal for positioning the arm 5 above the hole 9 according to the compensation necessary during the previous insertion.

The arm 5 is positioned at a predetermined position by the original positioning signal as follows. The positioning signals e and f, in the direction X and the direction Y, respectively, are forwarded from a central processing unit 12 to comparators 48, where the signals e and f are compared with output signals c and d of detectors (not shown) for detecting the actual position of the arm 5 in the direction X and the direction Y, respectively. The outputs of the comparators 48 are introduced into the direction-X controller 16 and the direction-Y controller 17, respectively, via the switch means 13, the compensation circuit 14, and the current amplifier 15. The actuators 18 and 19 are actuated by the controllers 16 and 17 so that the output of the comparators 48 is rendered zero. Thereby, the arm 5 is positioned at a predetermined position defined by the original positioning signals e and f. During this operation, the contacts of the switch means 13 are interconnected, as is illustrated by the solid lines in FIG. 11, by a control line circuit 42. In this way, the rod member is positioned above the hole. Then the rod member is inserted into the hole by the downward movement of the arm 5 controlled in the afore-mentioned manner using the signals a and b generated by the strain gauges attached to the parallel leaf spring assembly 3. If the rod member is positioned out of the range of the chamfer 10 of the hole 9, the CPU 12 detects this misalignment from the signals c and d and actuates the arm 5, using the positioning signals e and f, so that it is positioned at the predetermined position. By the above-mentioned control manner the rod member 7 is positioned above the hole 9 within the range of the chamfer 10. The rod member 7 is then moved downward to contact the chamfer 10 of the hole 9, and this situation is detected by the information signal from the strain gauges. Then, the arm 5 is precisely controlled so that the rod member 7 accurately aligns with the hole 9 in response to the signals corresponding to the displacement of the parallel leaf spring assembly 3 in the direction X and the direction Y.

Figure 12:
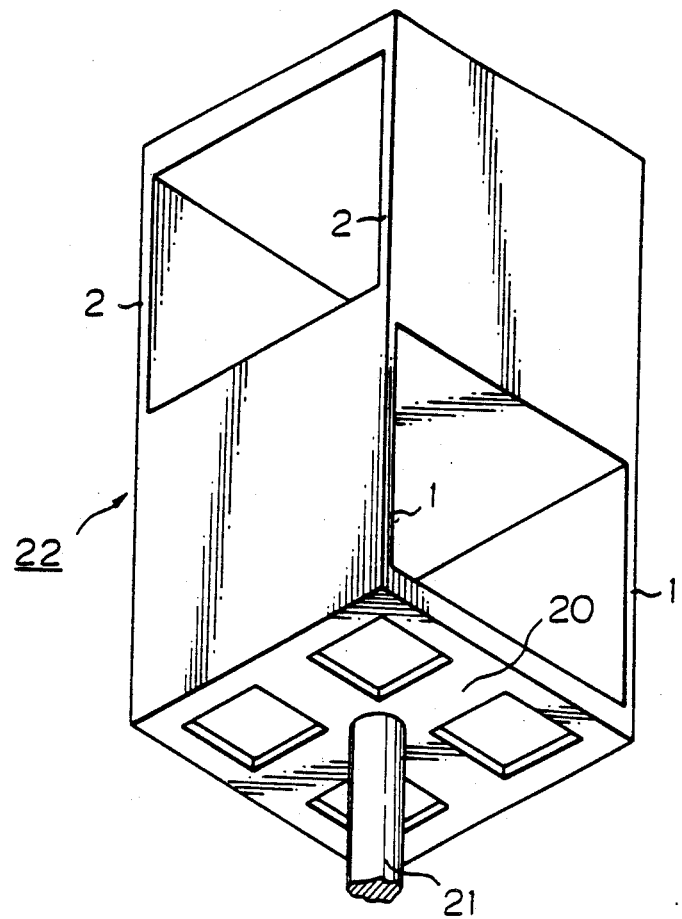
FIG. 12 is a perspective view of a mechanical compliance means according to the present invention.
Figure 13:
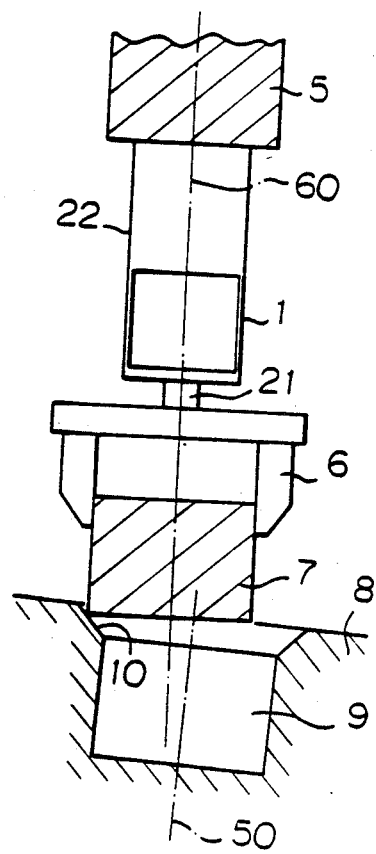
Figure 14:
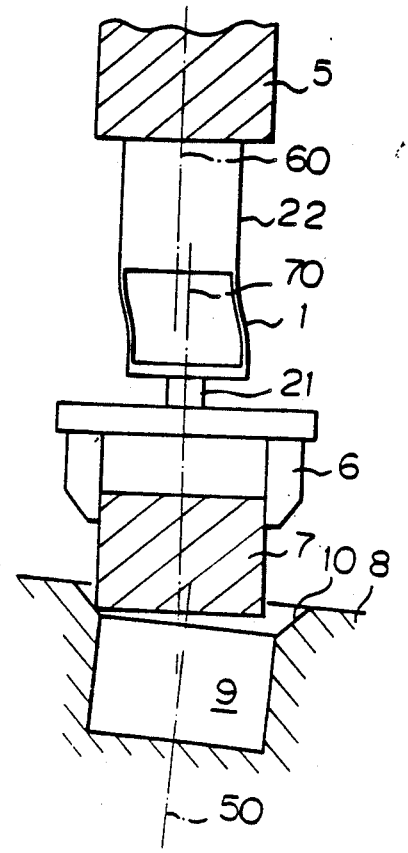

Another example of the mechanical compliance means in accordance with the present invention is illustrated in FIG. 12. The mechanical control means comprises a parallel leaf spring assembly 22 which comprises a first pair of parallel leaf springs 1 movable in the direction X, a second pair of parallel leaf springs 2 movable in the direction Y, and a cross-shaped leaf spring (diaphragm) 20 disposed at the bottom thereof. Reference numeral 21 designates a connection bar for connecting a hand to the parallel leaf spring assembly 22. The connection bar 21 can universally incline with respect to the vertical axis (longitudinal axis) of the parallel leaf spring assembly 22 and shift in the direction Z (vertical direction) due to the function of the cross-shaped leaf spring 20. This parallel leaf spring assembly 22 is useful in an insertion operation in which the axis 60 of the robot arm 5 is misaligned with and inclined with respect to the axis of the hole 9, as is illustrated in FIG. 13. When the arm 5 is moved downward, the rod member 7 held by the hand 6 abuts against the chamfer 10 of the hole 9. When the arm 5 is moved further downward, the parallel leaf spring assembly 22 deforms, as is illustrated in FIG. 14, so that the axis 70 of the hand 6 parallelly shifts away from the axis 60 of the arm 5, thereby enabling the rod member 7 to move downward along the chamber 10. The rod member 7 can be inserted into the hole 9 to a depth corresponding to the clearance between the rod member 7 and the hole 9 and the inclination of the rod member 7, with the axis 70 of the hand 6 being parallel with the axis 60 of the arm 5, as is illustrated in FIG. 15. When the arm 5 is moved yet further downward, the axis 70 of the hand 6 inclines with respect to the axis 60 of the arm 5 due to the function of the cross-shaped leaf spring 20 (FIG. 12), with the result that the rod member 7 can be further inserted into the hole 9, with the axis 70 of the hand 6 gradually approaching a vertical line so as to coincide with the axis 50 of the hole 9, as is illustrated in FIG. 16.

Figure 17:
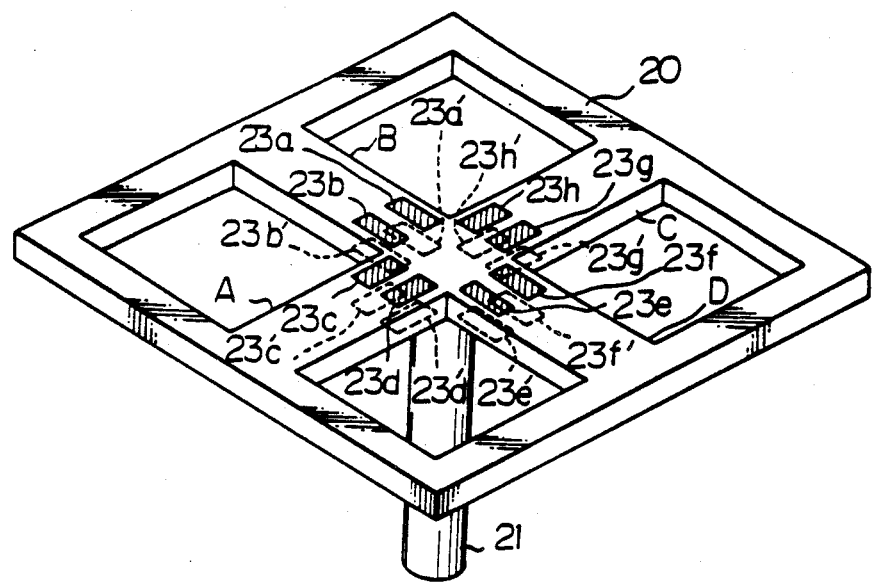
FIG. 17 is a perspective view of a cross-shaped leaf spring (diaphragm) showing an arrangement of strain gauges attached thereon.
Figure 18:
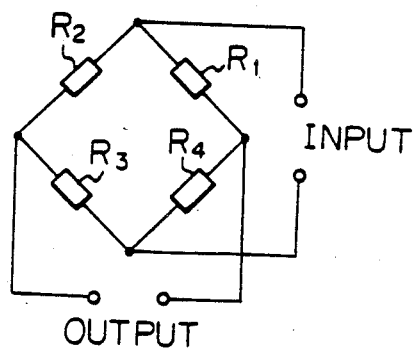
FIG. 18 is diagram of a block circuit comprising the strain gauges of FIG. 17.

Strain gauges are attached to the cross-shaped leaf spring 20, as is illustrated in FIG. 17. One main purpose of providing the cross-shaped leaf spring is to achieve smooth insertion of a member into a hole by absorbing and compensating for the relative inclination between the axis of the member and the axis of the hole. Strain gauges are attached to the cross-shaped leaf spring to detect deformation of the cross-shaped leaf spring due to a force applied thereto, which deformation corresponds to the relative inclination (angle misalignment) between the rod member and the hole. A signal indicating the relative inclination can be used in feedback control of the robot to achieve the insertion operation with the relative inclination being kept at zero. When a bending moment is applied to the cross-shaped leaf spring maximum deformation occurs at the center thereof. Therefore, it is desirable to attach the strain gauges in the vicinity of the center of the cross-shaped leaf spring. It is also desirable to attach a plurality of strain gauges to both sides of each of four leaf spring pieces A, B, C and D of the cross-shaped leaf spring 20, as illustrated in FIG. 17, so that any temperature differences due to differences of position can be compensated for and so that the S/N ratio can be upgraded. Strain gauges $23a$ to $23h$ are attached to the upper surface of the cross-shaped leaf spring, and strain gauges $23a'$ to $23h'$ are attached to the lower surface of the cross-shaped leaf spring and correspond to the strain gauges $23a$ to $23h$ attached to the upper surface thereof. These strain gauges constitute a bridge circuit, as is illustrated in FIG. 18. An output corresponding to the moment M of the leaf spring piece A is obtained by using strain gauges $23c$, $23c'$, $23d$, and $23d'$ as resistances $R_1$, $R_2$, $R_3$, and $R_4$, respectively, in the bridge circuit. Similarly, the moments $M_b$, $M_c$, and $M_d$ of the leaf spring pieces B, C, and D, respectively, can be detected by replacing the resistances $R_1$, $R_2$, $R_3$, and $R_4$ with: $23a$, $23a'$, $23b$, and $23b'$ (moment $M_b$); $23g$, $23g'$, $23h$, and $23h'$ (moment $M_c$); and $23e$, $23e'$, $23f$, and $23f'$ (moment $M_d$).

Figure 19:
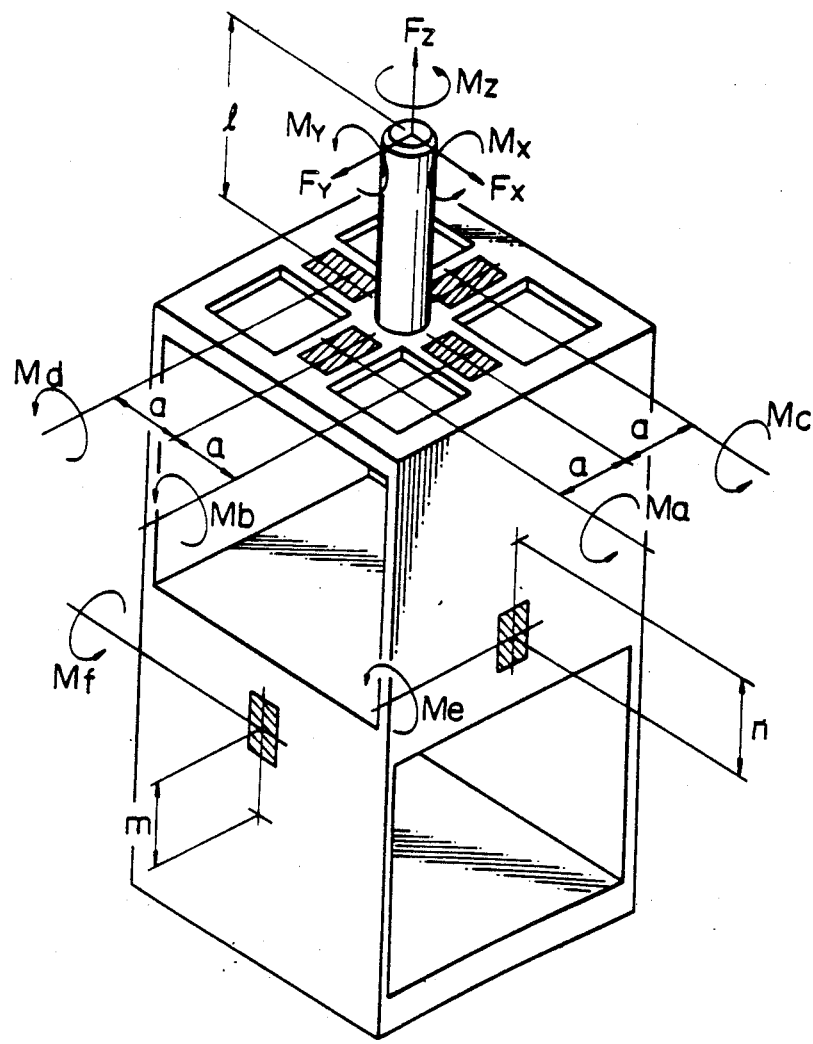
FIG. 19 is a diagram of the forces and torques applied to the compliance means according to the present invention.

It is possible to simply calculate the force applied to the robot hand in the direction X, the direction Y, and the direction Z and the moment (torques) about the X axis and Y axis on the basis of the output of the strain gauges attached to the cross-shaped leaf spring (diaphragm) and the parallel leaf spring assembly. As is shown in FIG. 19, the moment of each leaf spring piece of the cross-shaped leaf spring is represented by $M_a$, $M_b$, $M_c$, and $M_d$, and the moment of each pair of parallel leaf springs is represented by $M_e$ and $M_f$.

The moments are defined by the following equations:

$$M_a = M_X + aF_Z + lF_Y$$

$$M_b = M_Y - aF_Z - lF_X$$

$$M_c = M_X - aF_Z + lF_Y$$

$$M_d = M_Y + aF_z + lF_X$$

$$M_e = -nF_X$$

$$M_f = mF_Y$$

in which: $F_X$, $F_Y$, and $F_Z$ are force components applied to the robot hand in the direction X, the direction Y, and the direction Z, respectively; $M_X$ and $M_Y$ are moment components applied to the robot hand about the X axis and Y axis, respectively; l is the length between the center of the cross-shaped leaf spring and the connecting end of the robot hand connected to the parallel leaf spring assembly; n is the length between the strain gauge attached to the leaf spring movable in the direction X and the center of the leaf spring; m is the length between the strain gauge attached to the leaf spring movable in the direction Y and the center of the leaf spring; and a is the length between the strain gauge attached to the cross-shaped leaf spring and the center of the cross-shaped leaf spring. The direction of each moment is depicted by the arrows in FIG. 19.

The aforementioned equations can be modified as follows:

$$M_X = \frac{M_a + M_c}{2} - \frac{M_X \cdot l}{m}$$

$$M_Y = \frac{M_b + M_d}{2} - \frac{M_c \cdot l}{n}$$

$$F_X = -\frac{M_e}{n}$$

$$F_Y = \frac{M_f}{m}$$

$$F_Z = \frac{M_a - M_c}{2a} \text{ or } \frac{M_d - M_b}{2a}$$

The moment (torque) components and force components applied to the robot hand can be calculated by using such simple equations.

The calculation results $M_X$ and $M_Y$ can be used in feedback control of the insertion operation in such a manner that the rod member is inserted into the hole with the relative inclination between the rod member and the hole being kept at zero.

Figure 20:
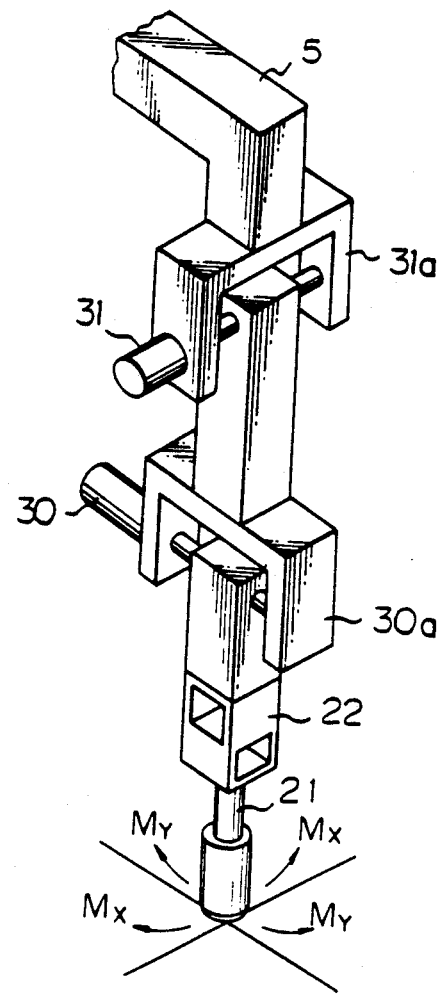
FIG. 20 is a perspective view of another example of the robot according to the present invention.

A robot comprising a means for compensating for the relative inclination between the rod member and the hole is illustrated in FIG. 20. The robot comprises a direction-X articulation or means 30a, which is actuated by a direction-X actuator or means 30, and a direction-Y articulation or means 31a, which is actuated by a direction-Y actuator or second means 31. In the insertion operation, using this robot, the relative inclination can be compensated for by actuating the direction-X articulation 30a in response to a signal, which corresponds to the moment $M_X$, from the strain gauges of the cross-shaped leaf spring and by actuating the direction-Y articulation 31a in response to a signal, which corresponds to the moment $M_Y$, from the strain gauges of the cross-shaped leaf spring. The operation of compensating for the relative inclination in the direction X and the direction Y can be carried out either simultaneously or alternately.

Figure 21:
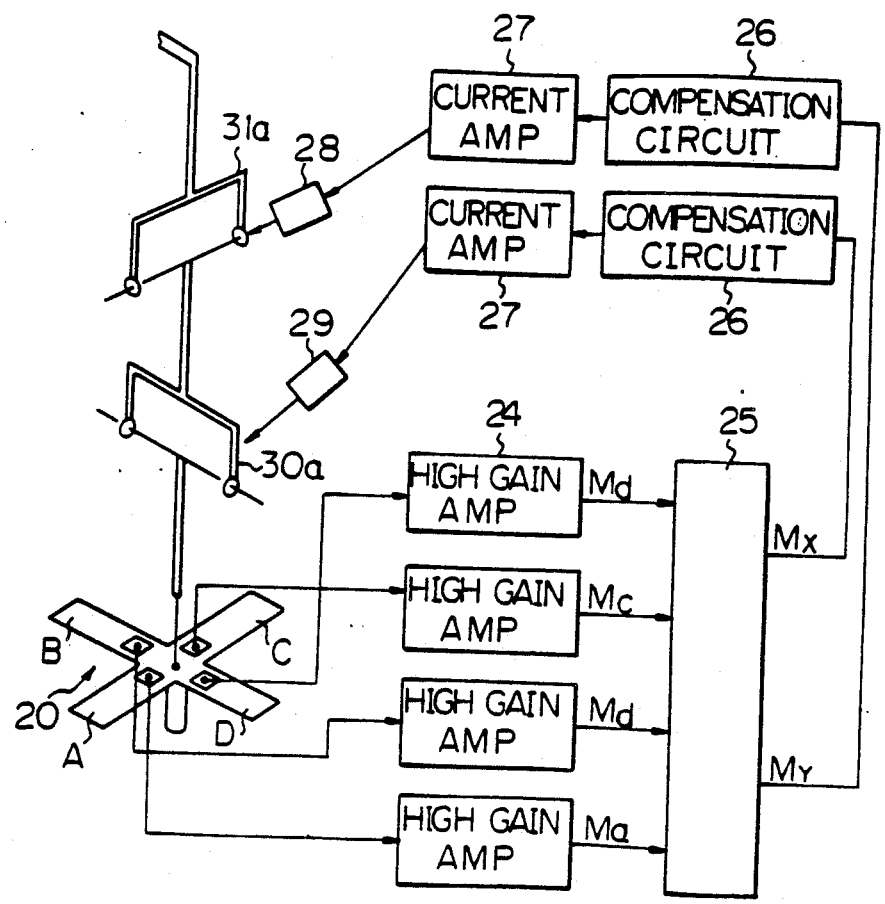
FIG. 21 is a control circuit diagram of the robot of FIG. 20.

A block diagram of the compensation means is illustrated in FIG. 21. The output signal from the strain gauges attached to each of the leaf spring pieces A, B, C, and D of the cross-shaped leaf spring 20 is introduced into a calculation circuit 25 through high-gain amplifiers 24. The calculation circuit 25 calculates the moments $M_X$ and $M_Y$ on the basis of the output signals from the strain gauges. The signal output from the calculation circuit 25 and corresponding to the moment $M_X$ is introduced into a direction-X controller 29 through a compensation circuit 26 and an amplifier 27 so as to actuate the direction-X articulation 30a in accordance with the relative inclination between the rod member and the hole until the relative inclination concerning the direction-X becomes zero. Similarly, the signal output by the calculation circuit 25 and corresponding to the moment $M_Y$ is introduced into a direction-Y controller 28 so as to actuate the direction-Y articulation 31a in accordance with the relative inclination between the rod member and the hole until the relative inclination concerning the direction Y becomes zero. The rod member shifts in the direction X and the direction Y due to the rotational movement of the articulations 30a and 31a in this compensation operation. Such displacement of the rod member in the direction X and the direction Y, however, can be compensated for by feedback control in accordance with the output signals from the strain gauges to the parallel leaf spring assembly, as previously mentioned.

Figure 22:
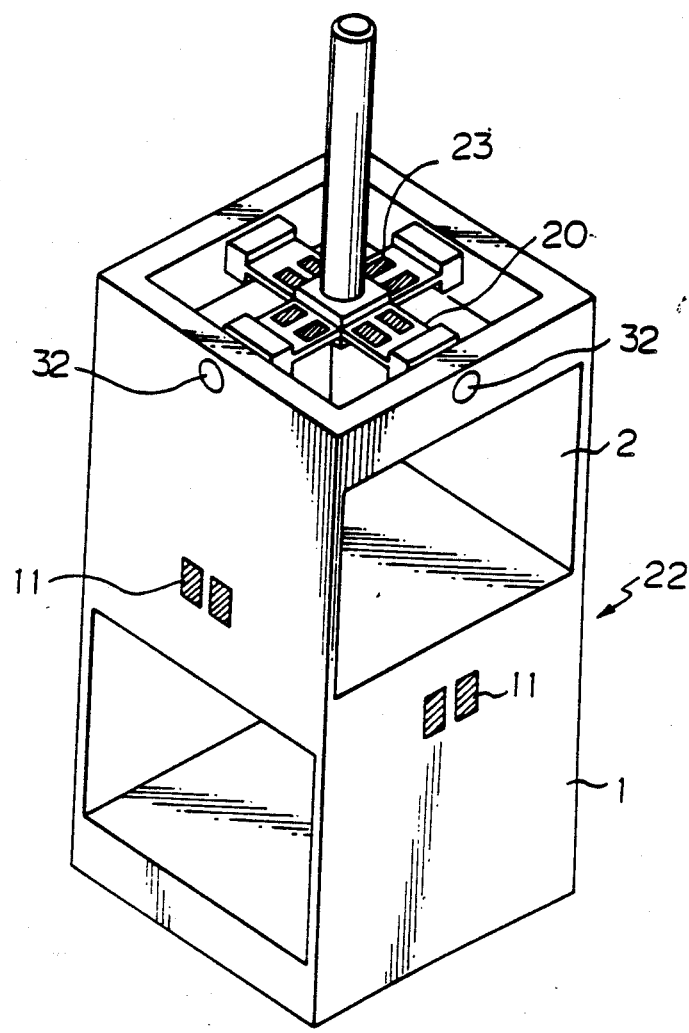
FIG. 22 is a perspective view of the cross-shaped leaf spring according to the present invention.
Figure 23:
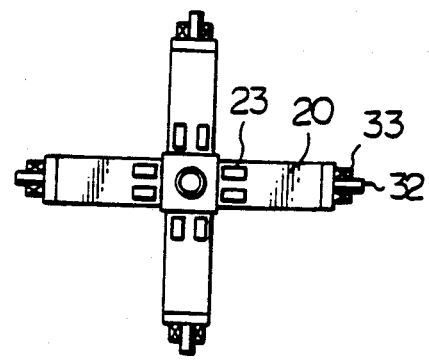
FIG. 23 is a plan view of the cross-shaped leaf spring of FIG. 22.
Figure 24:
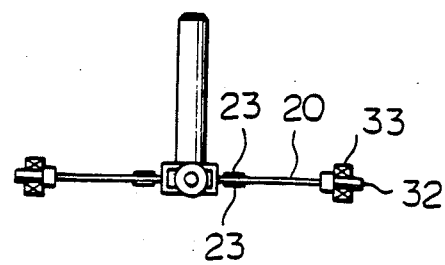
FIG. 24 is a side view of the cross-shaped leaf spring of FIG. 22.

Another example of the cross-shaped leaf spring is illustrated in FIGS. 22 to 24. A pivot 32 is provided at an end of each leaf spring piece of the cross-shaped leaf spring 20. The axis of the pivot is aligned with the longitudinal axis of each leaf spring piece. The cross-shaped leaf spring 20 is attached to the parallel leaf spring assembly 22 in such a manner that each leaf spring piece of the cross-shaped leaf spring 20 is supported by the side wall of the parallel leaf spring assembly 22 via the pivot 32 and the bearing 33 disposed on each pivot 32. With this arrangement, the deformation of one leaf spring piece does not cause other leaf spring pieces perpendicular to it to deform, with the result that the force components in the direction X and the direction Y can be accurately detected without interfering with each other, resulting in an increase of reliability of calculation of the moments $M_X$ and $M_Y$.

Figure 25:
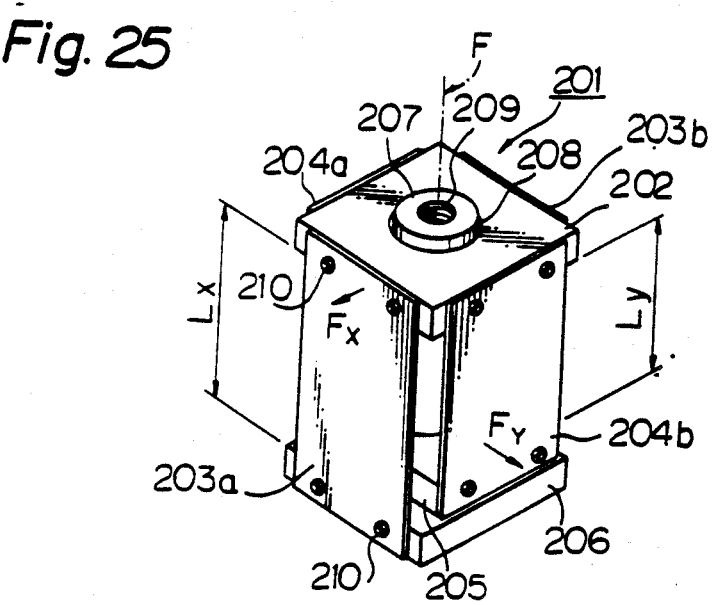
FIG. 25 is a perspective view of an example of a shortened structure of the compliance means located on the wrist portion of a robot according to the present invention.

FIG. 25 is a perspective view of another example of the mechanical compliance means according to the present invention. A wrist portion 201 comprises a first pair of parellel leaf springs 203a and 203b a second pair of parallel leaf springs 204a and 204b, the first pair being movable in the direction-X and the second pair being movable in the direction-Y perpendicular to the direction X. The upper end of each of the leaf springs 203a, 203b, 204a, and 204b is removably secured with screws 210 to a common square connection plate 202. The lower end of the first pair of parallel leaf springs 203a and 203b is secured with screws 210 to a first bottom plate 206, and the lower end of the second pair of parallel leaf springs 204a and 204b is secured with screws 210 to a second bottom plate 205. A connection rod 207 is secured to the second bottom plate 205. The connection rod 207 penetrates through a center hole 208 and connects with a robot arm (not shown). Reference numeral 209 designates a screw hole into which a screw means of the arm is inserted so as to interconnect the arm and the rod 207. Each of the leaf springs 203a, 203b, 204a, and 204b is interchangeable with another leaf spring of a different spring constant so that the resiliency of the wrist portion 201 can be changed. If a force F is applied to the connection rod 207, the first pair of parallel leaf springs 203a and 203b is forced to move in the direction X in accordance with the force component F of the force F in the direction X, and the second pair of parallel leaf springs 204a and 204b is forced to move in the direction Y in accordance with the force component F of the force F in the direction Y. The force F is thereby absorbed by the wrist portion 201. The movable range of the pairs of parallel leaf springs 203a, 203b, 204a, and 204b is limited by the diameter of the hole 208 since the connection rod 207 can move only within the hole 208.

Figure 26:
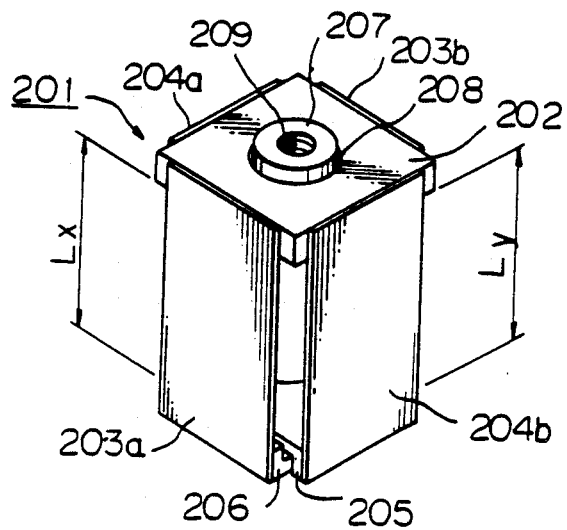
FIG. 26 is a perspective view of another example of the shortened structure of the compliance means located on the wrist portion of a robot according to the present invention.
Figure 27:
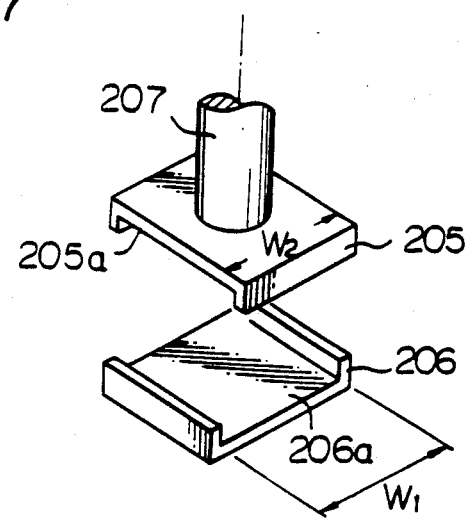
FIG. 27 is a partial, detailed view of the wrist portion of the robot of FIG. 26.

Another example of a mechanical compliance means according to the present invention is illustrated in FIG. 26. The first bottom plate 206 of the first pair of parallel leaf springs 203a and 203b has a recess 206a, as is illustrated in FIG. 27, so as to form a U-shaped bottom plate. Similarly, the second bottom plate 205 of the second pair of parallel leaf springs 204a and 204b has a recess 205a. The recesses 205a and 206a face each other so that one of the bottom plates is received within the recess of the other bottom plate. The movable range of the leaf springs is determined by the difference between the width $W_1$ of the recess and the width $W_2$ of the bottom plate to be positioned in the recess. With this structure, the length $L_X$ of the springy portion of the first pair of parallel leaf springs 203a and 203b can be made equal to the length $L_Y$ of the springy portion of the second pair of parallel leaf springs 204a and 204b. Therefore, leaf springs of the same size and the same spring constant can be used as the first and the second pairs of leaf springs 203a, 203b, 204a, and 204b. The construction and function of the example of FIG. 26, except for the above points, are the same as those of the example of FIG. 25.

Figure 28:
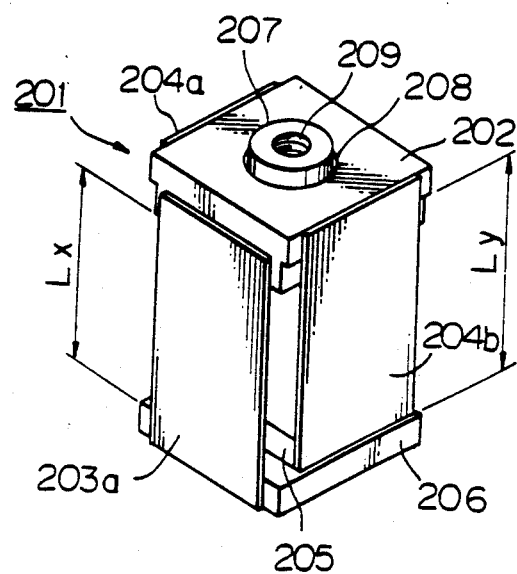
FIG. 28 is a perspective view of another example of the shortened structure of the compliance means located on the wrist portion of a robot according to the present invention.

A further example of the mechanical compliance means according to the present invention is illustrated in FIG. 28. In this example, the level of the connection portion of the first pair of parallel leaf springs 203a and 203b having the connection plate 202 is lowered with respect to the level of the connection portion of the second pair of parallel leaf springs 204a and 204b, with the result that the length $L_X$ of the springy portion of the first pair of parallel leaf springs 203a and 203b is equal to the length $L_Y$ of the springy portion of the second pair of parallel leaf springs 204a and 204b. The construction and function of the example of FIG. 28, except for the above point, are the same as those of the example of Fg. 25.

Figure 29:
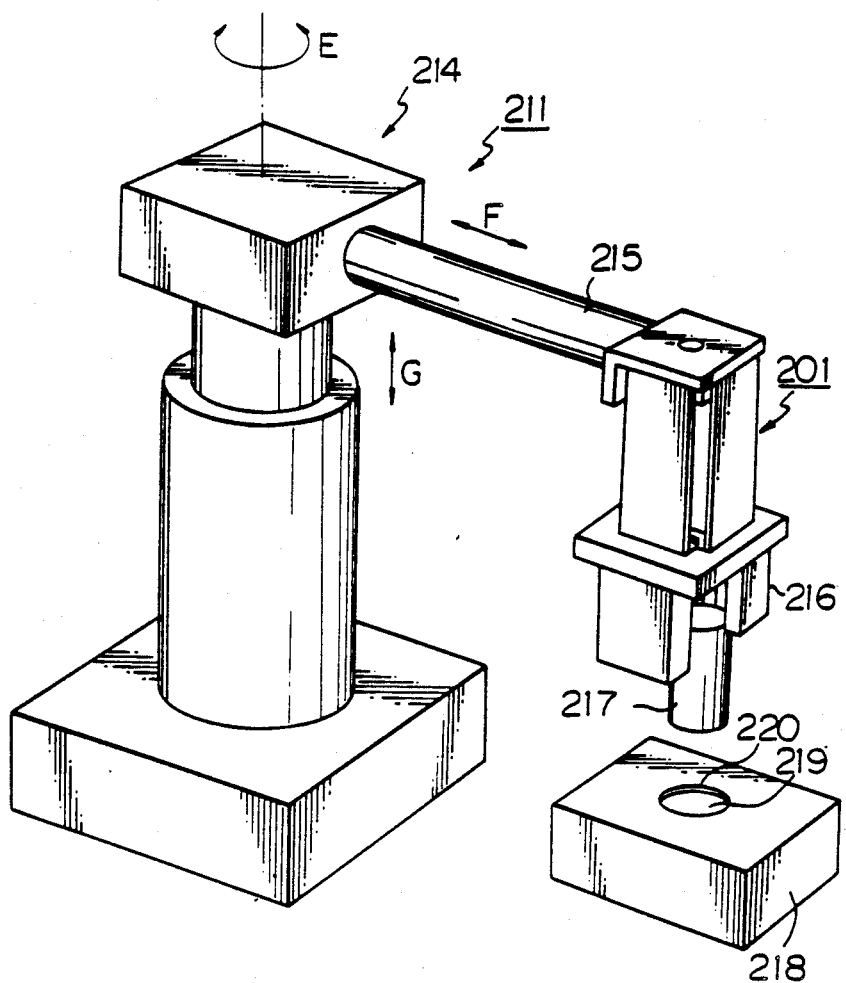
FIG. 29 is a perspective view of an example of the robot relating to the present invention.
Figure 30:
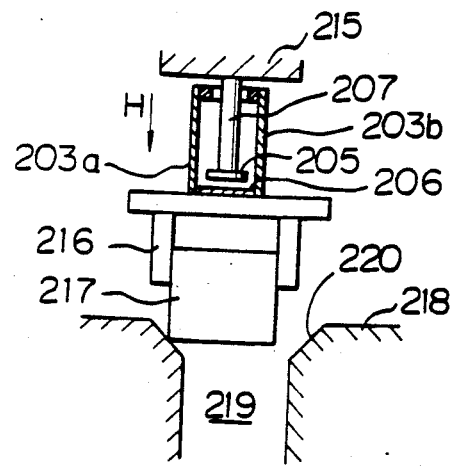
FIGS. 30 and 31 are respective sectional views of the compliance means located on the wrist portion according to the present invention showing an insertion operation, in series.
Figure 31:
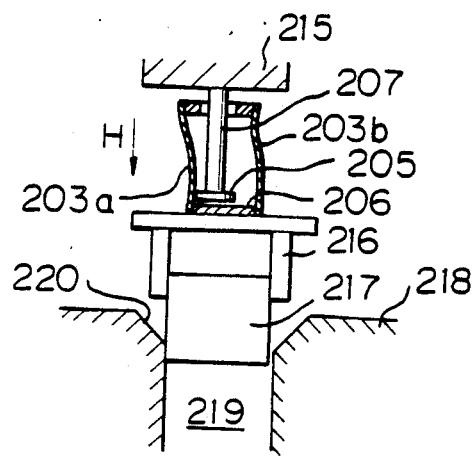

A robot 214 provided with the above-mentioned wrist portion 201 comprising a parallel leaf spring assembly is illustrated in FIG. 29. The wrist portion 201 comprising a parallel leaf spring assembly is disposed between the arm 215 and the hand 216 of the robot 214. The arm 215 can be rotated in a forward direction and in a reverse direction, as is shown by the arrows E, and can be extended and retracted, as is shown by the arrows F. The arm 215 can also be shifted vertically, as is shown by the arrows G. A cylindrical rod member 217 is picked up and held by the hand 216 at a predetermined station (not shown) and is conveyed to a position above a hole 219 of a block 218. Then the rod member 7 is inserted into the hole 219 by the downward movement of the arm 215. The inlet edge of hole 219 is bevelled so as to form a chamfer 220. If the rod member 217 is misaligned with the hole 219 within the range of the inclined surface 220, the rod member 217 abuts against the inclined surface 220 when it is lowered, as is illustrated in FIG. 30. At this point horizontal force components in the direction X and the direction Y are generated in accordance with the vertical insertion force H. Therefore, the parallel leaf spring assembly is deformed and moved in the direction X and the direction Y, as is illustrated in FIG. 31, so that the rod member 217 is inserted into the hole 219, sliding downward along the chamfer 220. In FIG. 31, only deformation of the first pair of parallel leaf springs 203a and 203b is illustrated.

Figure 32:
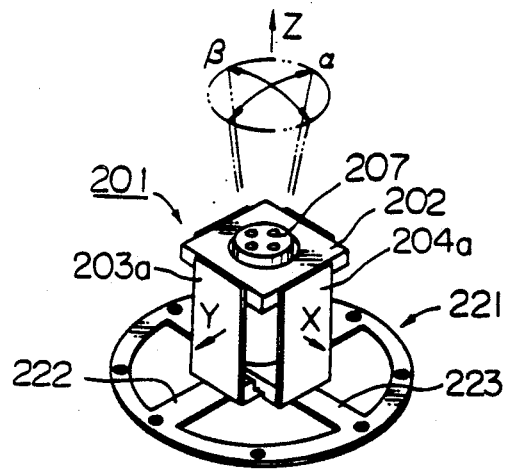
FIG. 32 is a perspective view of yet another example of the wrist portion of a robot according to the present invention.

A further example of the mechanical compliance means is illustrated in FIG. 32. A cross-shaped leaf spring 221 comprising leaf spring pieces 222 and 223 which cross each other is attached to the lower end of the wrist portion 201 (illustrated in FIG. 26) comprising the first pair of parallel leaf springs 203a and 203b and the second pair of parallel leaf springs 204a and 204b.

The hand (not shown) is connected to the wrist portion 201 via the cross-shaped leaf spring 221. The vertical axis of the wrist portion 201 can be rotatably moved in the direction of $\alpha$ about the X axis by bending the leaf spring piece 222 and twisting of the leaf spring piece 223. The vertical axis of the wrist portion 201 can also be rotatably moved in the direction of $\beta$ about the Y axis by bending the leaf spring piece 223 and twisting of the leaf spring piece 222. The wrist portion 201 can move vertically in the direction Z due to the springy function of the cross-shaped leaf spring 221. The compliance means comprising the parallel leaf spring assembly and the above-mentioned cross-shaped leaf spring allows five degrees of freedom since the parallel leaf spring assembly can move in the direction X and the direction Y.

Figure 33:
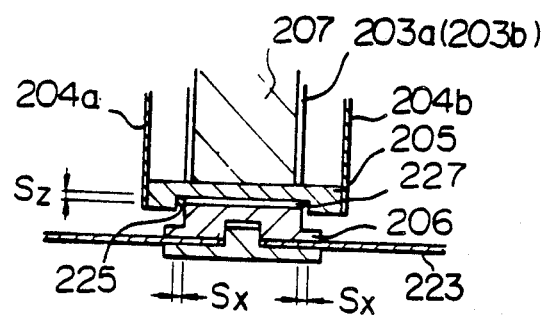
FIG. 33 is a partial sectional view of the wrist portion of FIG. 32.
Figure 34:
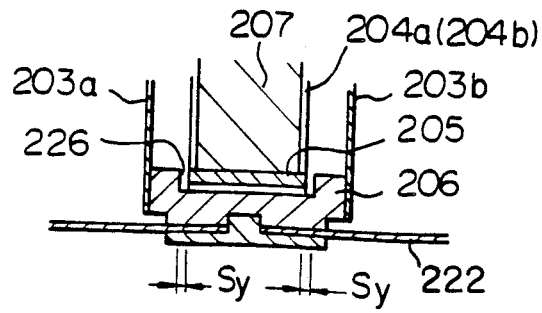
FIG. 34 is another partial sectional view of the wrist portion of FIG. 32.

The lower part of the above-mentioned wrist portion is illustrated in FIGS. 33 and 34. As was mentioned above, each of the bottom plates 205 and 206 of the parallel leaf spring assembly has a recess. The movable ranges ($S_X$ and $S_Y$) of the robot hand with respect to the robot arm in the direction X and the direction Y are defined by the gaps 225 and 226, respectively, which correspond to the difference between the width of the recess and the width of the bottom plate received within the recess. The movable range ($S_Z$) of the robot hand with respect to the robot arm in the direction Z is defined by a gap 227 between the upper bottom plate 205 and the lower bottom plate 206. Such an arrangement protects the compliance means from being crushed.

Figure 35:
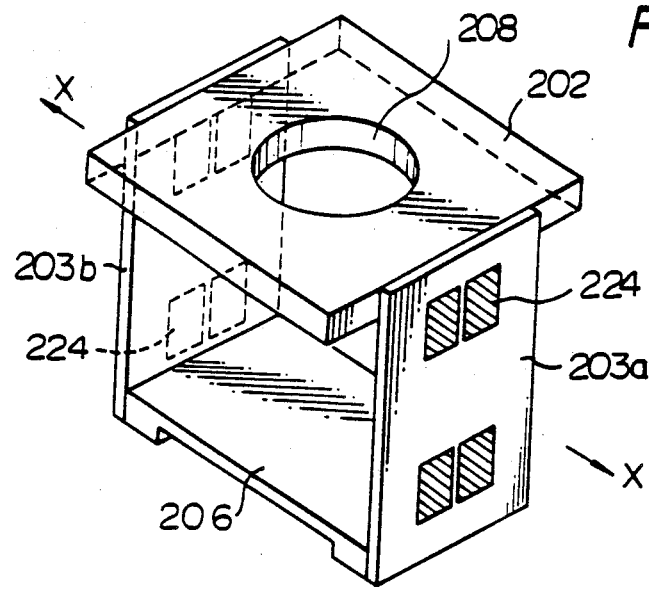
FIG. 35 is a perspective view of one pair of parallel leaf springs of the wrist portion of FIG. 32 with strain gauges provided thereon.
Figure 36:
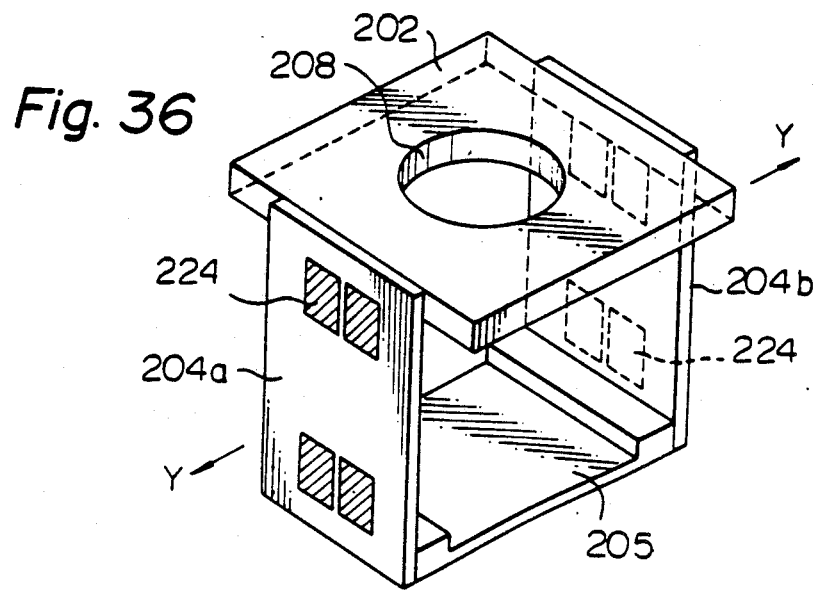
FIG. 36 is a perspective view of the other pair of parallel leaf springs of the wrist portion of FIG. 32 with strain gauges provided thereon.
Figure 37:
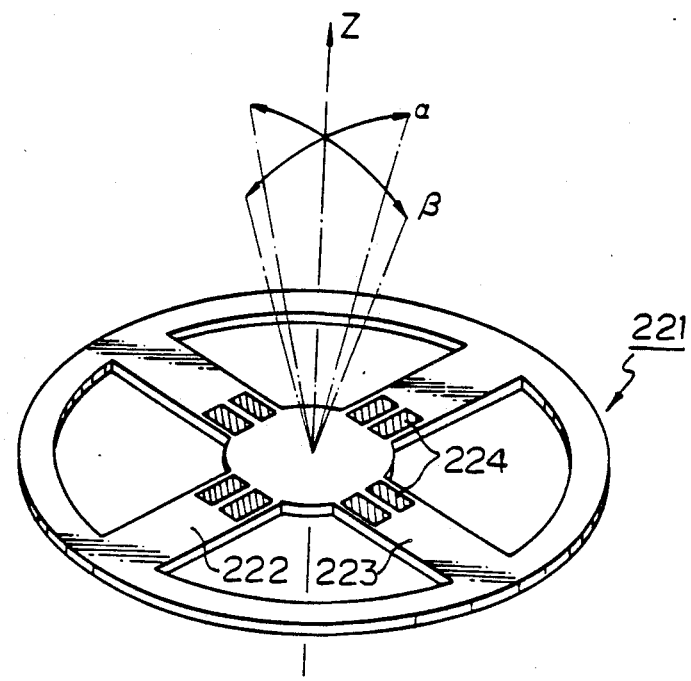
FIG. 37 is a perspective view of the cross-shaped leaf spring of the wrist portion of FIG. 32 with strain gauges provided thereon.

The positioning of the robot arm can be controlled by a feedback control process in accordance with the misalignment and relative inclination between the members to be manipulated by the robot. The misalignment and relative inclination can be detected by strain gauges 224, as is illustrated in FIGS. 35 and 36, attached to the leaf springs which constitute the wrist portion having five degrees of freedom. It is desirable to attach the strain gauges 224 at the upper and the lower ends of the parallel leaf springs 203a, 203b, 204a, and 204b, since deformation of the leaf springs is maximum at the end portions thereof. Also, it is desirable to attach the strain gauges 224 in the vicinity of the center of the cross-shaped leaf spring 221, as is illustrated in FIG. 37, since deformation of the leaf springs 222 and 223 is maximum at the center of the cross-shaped leaf spring 221.

As mentioned above, a cross-shaped leaf spring is used as a springy means for absorbing the displacement in the direction Z in the above explanation. It is possible to use another springy means, such as a Y-shaped leaf spring comprising three leaf spring pieces or a polygonal-shaped leaf spring comprising radiating leaf spring pieces. However, the equations for calculating the force components and moment components are complicated when these springy means are used instead of a cross-shaped leaf spring. It is desirable to use a cross-shaped leaf spring from the viewpoint of ease of calculation of the force components and moment components on the basis of the afore-mentioned simple equations. Such a cross-shaped leaf spring mechanism can also be composed by using a diaphragm.

Also, as was mentioned above, in accordance with the present invention, there is provided a mechanical compliance means which makes it possible to move the robot hand relative to the robot arm in accordance with the misalignment and the relative inclination between the members to be manipulated by the robot. Therefore, the operation of inserting a rod member into a hole of a block member can be smoothly carried out even if the positioning of the members is roughly controlled, with the result that damaging of the members is prevented and no expensive position-control means of a high accuracy to necessary. Also, excessive deformation of the leaf springs is prevented since a limitation means for limiting the movement of the leaf springs in the directions X, Y, and Z is provided so that damaging of the leaf springs due to excessive buckling stress or bending stress is prevented.

Also, by using a shortened structure of the parallel leaf spring assembly of FIG. 25, 26 or 28, a compact wrist of a robot can be obtained.

An insertion operation of the robot can be performed by using above mentioned compliance means even if the positioning of the robot arm is roughly controlled. If, however, the degree of compliance, or elasticity, of the compliance means is large to allow a smooth insertion operation, the vibration of the compliance means after the robot arm is positioned at a predetermined place continues for a long time since the spring force of the degree of compliance means of large compliance is weak. On the other hand, if the degree of compliance of the compliance means is small so as to shorten the attenuation time of the vibration thereof, a smooth insertion operation cannot be performed since the spring force of the compliance means with a small degree of compliance is strong. Therefore, it is desirable to vary the compliance of the compliance means so that the spring is stiffened when the article to be handled is moved, while the spring is softened when the insertion operation is carried out, so as to achieve a smooth insertion operation in high speed. Such a compliance means of variable compliance will be described hereinafter.

Figure 38:
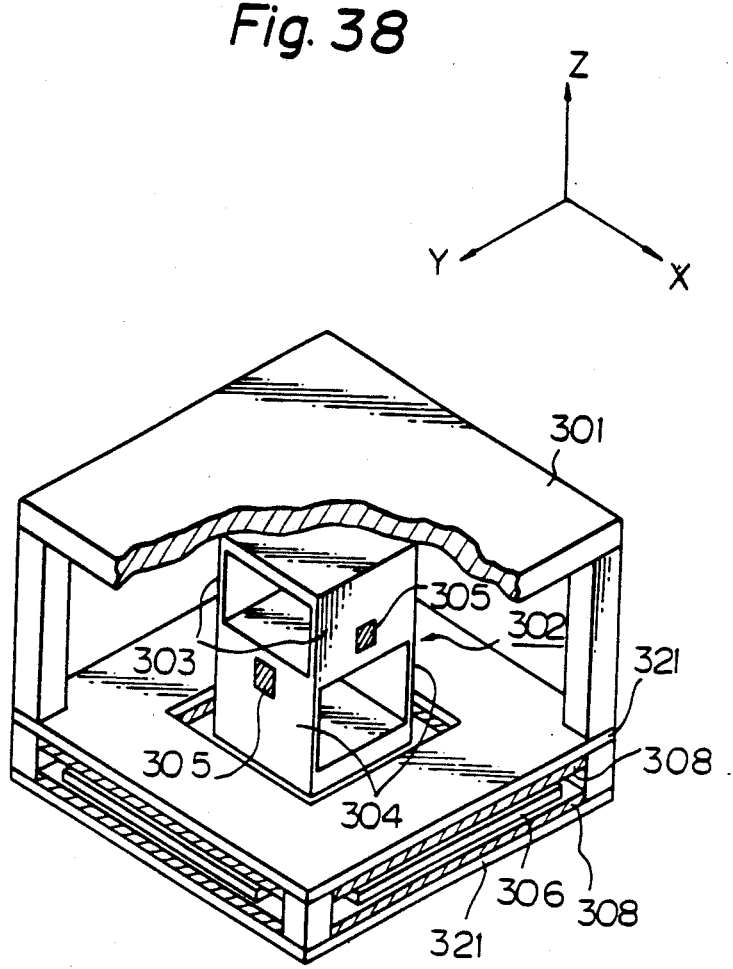
FIG. 38 is a perspective view of the wrist portion of a robot in accordance with the present invention seen from the upper side thereof.
Figure 39:
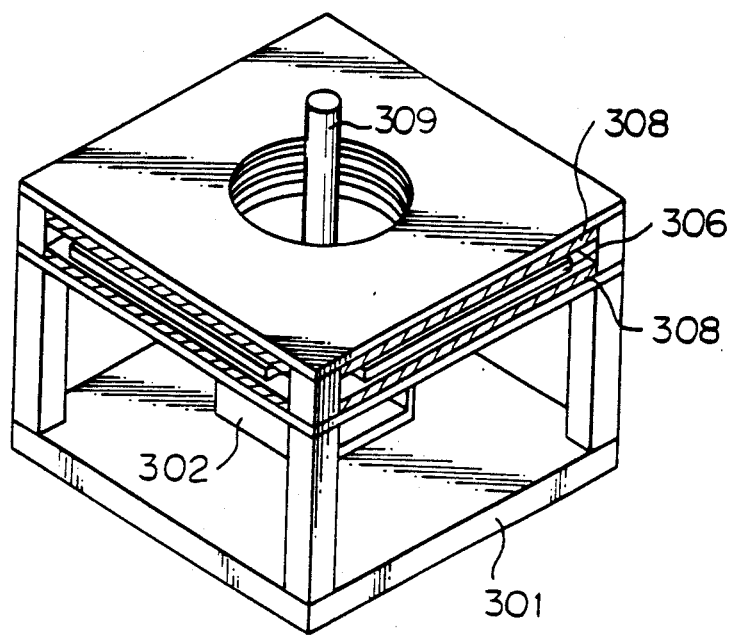
FIG. 39 is a perspective view of the wrist portion of FIG. 38 seen from the lower side thereof.

FIGS. 38 and 39 are perspective views of a wrist portion of the robot relating to the present invention seen from the upper side and the lower side thereof, respectively. A parallel leaf spring assembly 302 is secured to a wrist support plate 301 which is connected to an arm (not shown). The parallel leaf spring assembly 302 comprises a first pair of parallel leaf springs 303 movable in the direction X and a second pair of parallel leaf springs 304 movable in the direction Y. A hand (not shown) is connected to the lower end of the parallel leaf spring assembly 302 via a connection rod 309. In the operation of inserting a rod member into a hole, misalignment between the rod member and the hole can be compensated for by the parallel leaf spring assembly due to deformation of the leaf springs 303 and 304, in accordance with force components in the direction X and the direction Y. Strain gauges 305 are attached to the leaf springs 303 and 304 so as to detect deformation thereof. It is desirable that the strain gauges 305 be positioned at the upper or lower end of each leaf spring since deformation of each leaf spring is maximum at the ends thereof. Displacement of the robot hand with respect to the robot arm in the direction X and the direction Y can be detected on the basis of deformation of the leaf springs 303 and 304 detected by the strain gauges 305.

A planar coil plate 306 is connected to the connection rod 309. The planar coil plate 306 comprises a first planar coil (not shown) for actuating the connection rod 309 so as to bias it in the direction X and a second planar coil (not shown) for actuating the connection rod 309 so as to bias it in the direction Y. Each planar coil is disposed between upper and lower magnets 308 which are magnetically connected to each other via yokes 321. The assembly of the planar coil 306, the magnets 308, and the yokes 321 forms a direct-current (DC) planar motor. This DC planar motor constitutes a biasing means for adjusting the resiliency of the parallel leaf spring assembly by applying a force thereto in the direction X and the direction Y.

Figure 40:
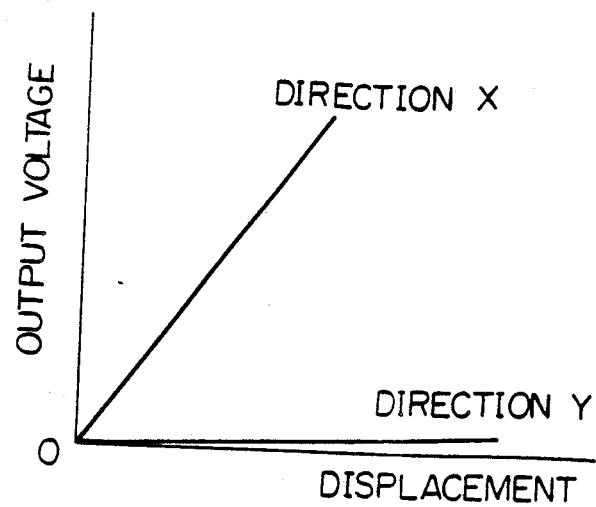
FIG. 40 is a graph of the output voltage of the strain gauges according to the present invention.

The graph of FIG. 40 represents the output voltage of the strain gauges 305 for detecting the force component of the direction X and that of the direction Y when force is applied to the parallel leaf spring assembly only in the direction X. As can be seen from the graph, the output voltage linearly changes with respect to the displacement, and the output voltage of the direction X and the output voltage of the direction Y do not interfere with each other. It is, therefore, possible to control the movement of the parallel leaf spring assembly 302 by independently controlling the force components in the direction X and the direction Y in accordance with the signals output by the strain gauges for detecting the force components in the direction X and the direction Y, respectively. By controlling the force components in the direction X and the direction Y, respectively, it is possible to shift the lower end of the parallel leaf spring assembly 302 to a desired position with respect to the robot arm due to the combined force of the force components of the direction X and the direction Y so that the compliance of the parallel leaf spring assembly 302 can be changed. For example, when the parallel leaf spring assembly is shifted in the direction X, the compliance of the parallel leaf spring assembly can be increased by applying force thereto in the same direction as that of displacement of the parallel leaf spring assembly by actuating the planar coil in the direction X of the DC planar motor. On the other hand, the compliance of the parallel leaf spring assembly can be decreased by applying force thereto in a direction reverse to that of displacement of the parallel leaf spring assembly.

The voltage and the equation of motion of the above-mentioned DC planar motor are represented as follows.

$$v = Ri + L\frac{di}{dt} + Bl\frac{dX}{dt} \qquad (1)$$

$$Bli = M\frac{d^2 X}{dt^2} + \beta\frac{dX}{dt} + k \qquad (2)$$

in which:
v: voltage between the terminals of the motor;
R: resistance between the terminals of the motor;
i: current of the motor;
L: inductance of the motor;
B: magnetic flux density of the motor;
l: effective length of the coil of the motor;
M: mass of the movable member;
B: coefficient of the viscous damping;
k: spring constant of the parallel leaf spring assembly;
X: displacement of the parallel leaf spring assembly; and
t: time.

Figure 41:
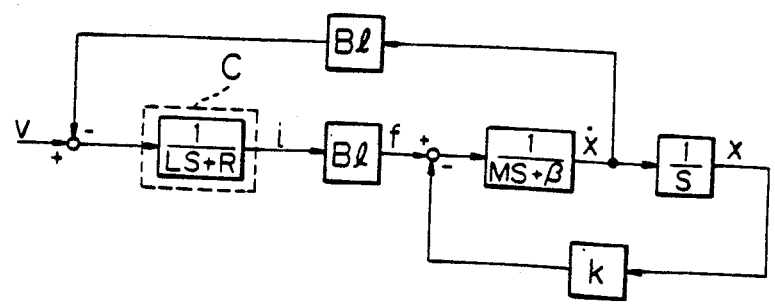
FIG. 41 is a block diagram of a circuit for controlling the wrist portion of a robot according to the present invention.
Figure 42:
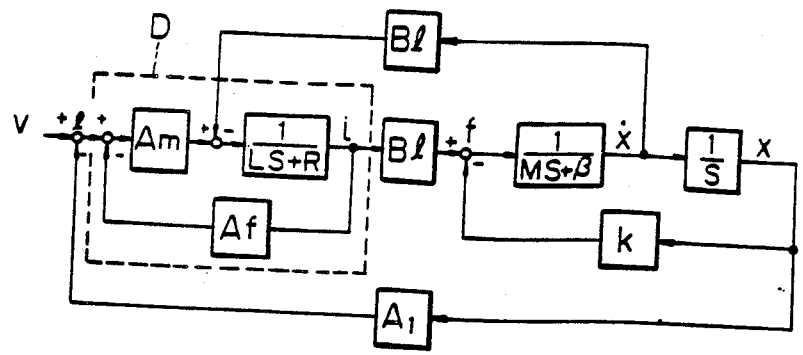
FIG. 42 is another block diagram of a circuit for controlling the wrist portion of a robot according to the present invention.

The above equations are represented by the block diagram of FIG. 41. FIG. 42 is a position feedback control block diagram of a modification of FIG. 41, in which the displacement X is fed back into the input of the circuit through the gain $A_1$ and the current i is fed back into the circuit C. The transmission function of the circuit D of FIG. 42, hereinafter referred to as $A_2$, is as follows.

$$E(S) = \frac{1}{Am} \{(LS + R + AfAm) I(S) + BlSX(S)\} \quad (3)$$

Figure 43:
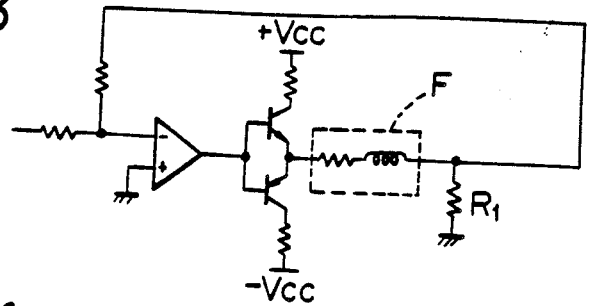
FIG. 43 is a partial, detailed circuit diagram of the circuit of FIG. 42.

If the circuit Am comprises the circuit of FIG. 43, it is possible that $Am \approx \infty$, and $A_2$ is represented as follows:

$$E(S) = AfI(S) \quad (4)$$

$$A_2 = \frac{I(S)}{E(S)} = \frac{1}{Af} \quad (5)$$

The current rise characteristic due to the inductance L can be ignored. Therefore, the closed-loop transfer function G(S) is represented as follows.

$$G(S) = \frac{Bl A_2}{MS^2 + \beta S + k + A_1 A_2 Bl} \quad (6)$$

The condition in which the equation of (6) is stable is as follows.

$$k + A_1 A_2 Bl > 0 \quad (7)$$

The equation of (7) represents stiffness. If $A_2=1(-V/A)$, then the following equation is obtained from the equation (7).

$$A_1 > \frac{-k}{Bl} \quad (8)$$

This equation (8) means that the compliance Cm of the parallel leaf spring assembly can be changed in a stable manner within the range $$0 < Cm < \infty$$

by changing $A_1$ from $$-\frac{k}{Bl}$$

to $\infty$. If $$-\frac{k}{Bl} < A_1 \leq 0,$$

then $$\frac{1}{k} \leq Cm < \infty.$$

If $0 < A_1 < \infty$, then $$0 < Cm < \frac{1}{k}.$$

Therefore, if $A_1$ is negative, the parallel leaf spring assembly is softened, and if $A_1$ is positive, the parallel leaf spring assembly is stiffened. Any desired compliance of the parallel leaf spring assembly can be obtained by changing $A_1$ and $A_2$ in the above-mentioned manner. The diagram D of FIG. 42 can be realized by a circuit shown in FIG. 43. In FIG. 43, F designates an equivalent circuit of the motor, $R_1$ designates the resistance, and Am and Af in FIG. 42 designate the gain.

Figure 44:
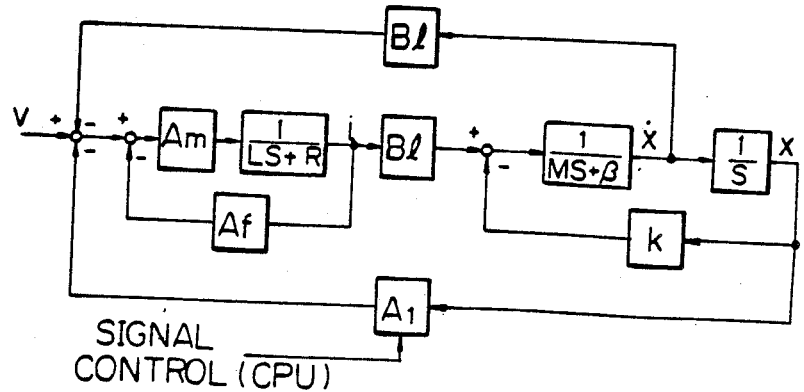
FIG. 44 is a block diagram of a unit controlling the wrist portion of a robot according to the present invention.

As is illustrated in FIG. 44, the CPU controls the signal of the position feedback gain $A_1$ in accordance with the operations, such as a conveying operation or assembling operation, of the robot so as to obtain an optimum compliance of the parallel leaf spring assembly by selecting a positive signal or a negative signal.

Figure 45:
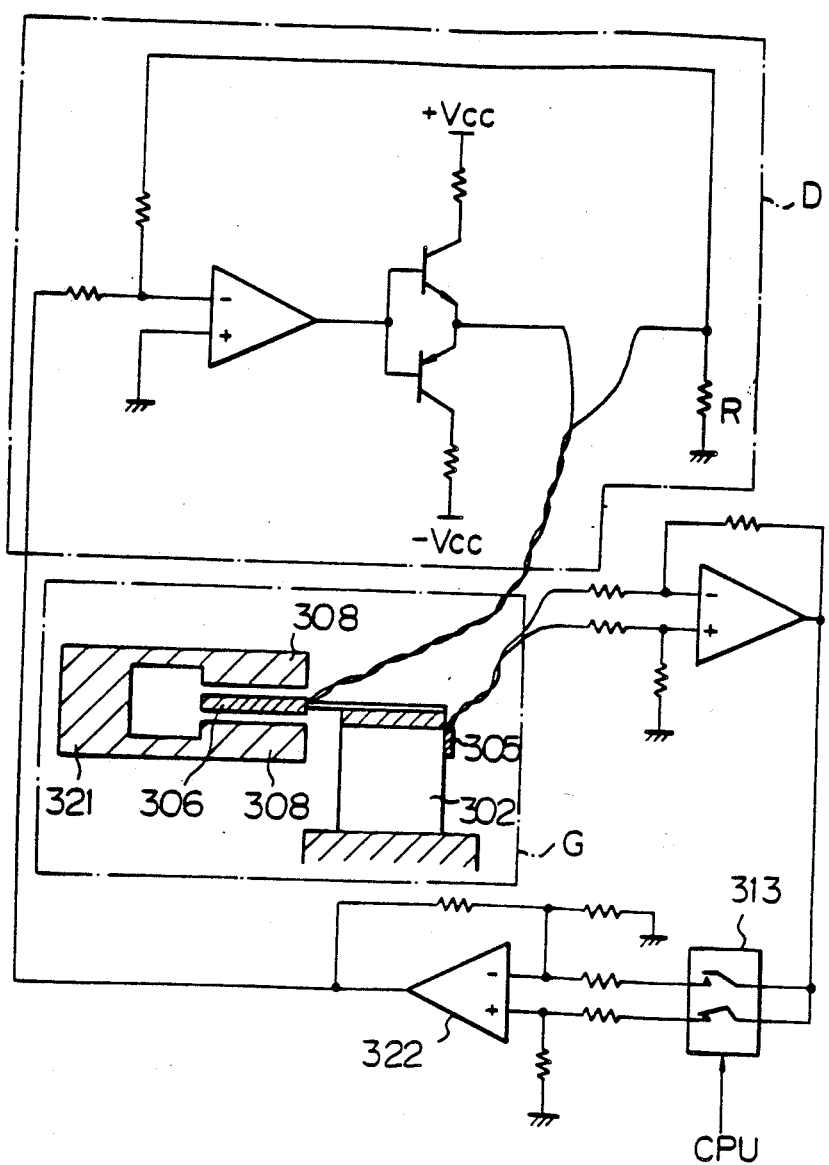
FIG. 45 is a diagram of a circuit for controlling the wrist portion of a robot according to the present invention.

An example of the control circuit of the signal of the position feedback gain A is illustrated in FIG. 45, wherein G designates a DC planar motor. Reference numeral 313 designates a transfer-type analogue switch which comprises two contacts which alternately turn on. The analogue switch 313 is controlled by the CPU so as to make the signal of the position feedback gain $A_1$ (+) or (−) by applying the signal from the strain gauges 305 to the (+) or (−) terminal of the amplifier 322 by changing the contacts of the analogue switch 313.

Figure 46:
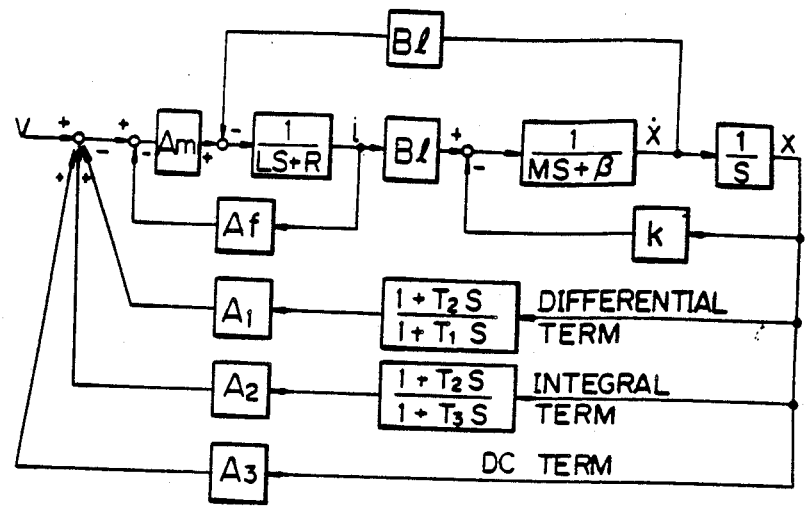
FIG. 46 is a further block diagram of a unit for controlling the wrist portion of a robot according to the present invention.
Figure 47:
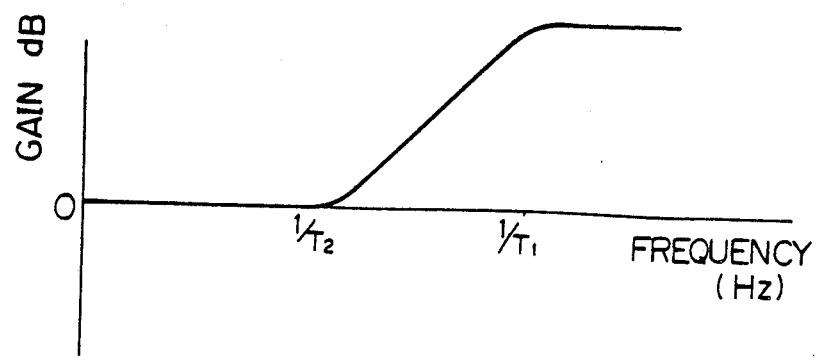
FIG. 47 is a graph of the gain characteristic of the differential term of the diagram of FIG. 46.
Figure 48:
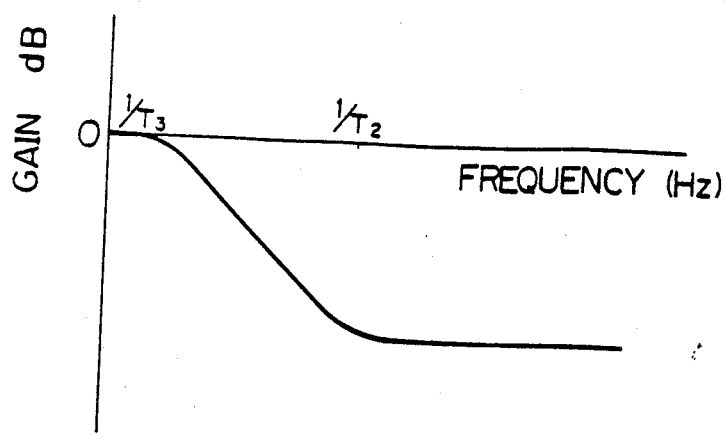
FIG. 48 is a graph of the gain characteristic of the integral term of the diagram of FIG. 46.
Figure 49:
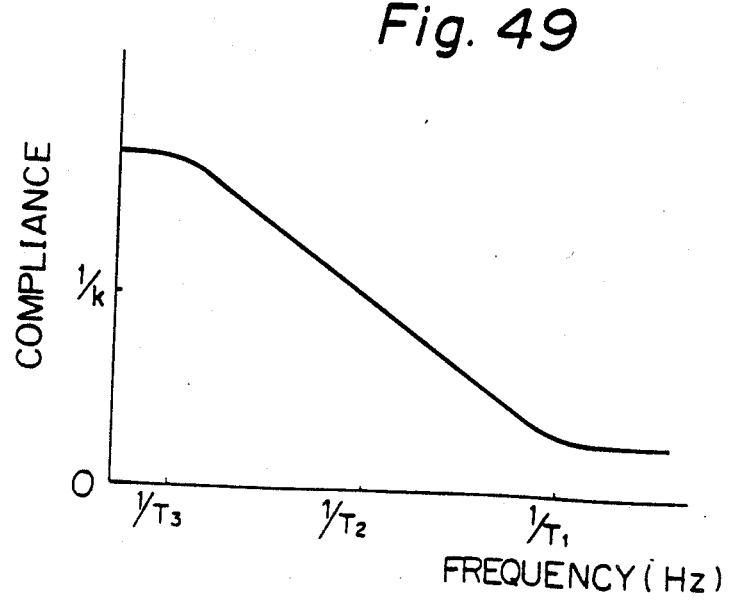
FIG. 49 is a graph of the gain characteristic of a combination of the differential term and the integral term of the diagram of FIG. 46.

Another example of the variable compliance circuit is illustrated in FIG. 46. In this example, integration of the signal from the strain gauges in accordance with the displacement of the parallel leaf spring assembly is used as a positive feedback term, and differentiation of the signal from the strain gauges is used as a negative feedback term. Also, a DC term is used as a positive feedback term so as to obviate the gain $A_1$ of a low frequency region of a differential term, which region represents slow movement of the robot. FIG. 47 is a Bode diagram of a differential term, and FIG. 48 is a Bode diagram of an integral term. With respect to a differential term, in a region of frequency of more than $1/T_2$ Hz, the parallel leaf spring assembly is stiffened since the compliance thereof is lowered in accordance with an increase of the amount of negative feedback due to an increase of gain. With respect to an integral term, in a region of frequency between $1/T_3$ and $1/T_2$, the compliance is lowered to about 1/k of the compliance of the spring since the gain is decreased. The gain characteristic of a combination of the gain characteristics of FIG. 47 and FIG. 48 can be obtained by the circuit of FIG. 46. Such a combination of gain characteristics corresponds to the compliance characteristic with respect to the frequency, which is represented in FIG. 49.

(i) When the frequency $f_Z$ is $f_Z \leq 1/T_3$, the compliance Cm is represented as $Cm \approx \infty$ in the condition that $A_2 \approx k/Bl$.

(ii) When $1/T_3 < f_Z \leq 1/T_2$, the compliance Cm is represented as $1/k < Cm < \infty$.

(iii) When $1/T_2 < f_Z \leq 1/T_1$, the compliance Cm is represented as $0 < Cm < 1/k$.

Therefore, it is possible to vary the compliance of the parallel leaf spring assembly so that the parallel leaf spring assembly is stiffened when the robot moves rapidly and is softened when the robot moves slowly.

Figure 50:
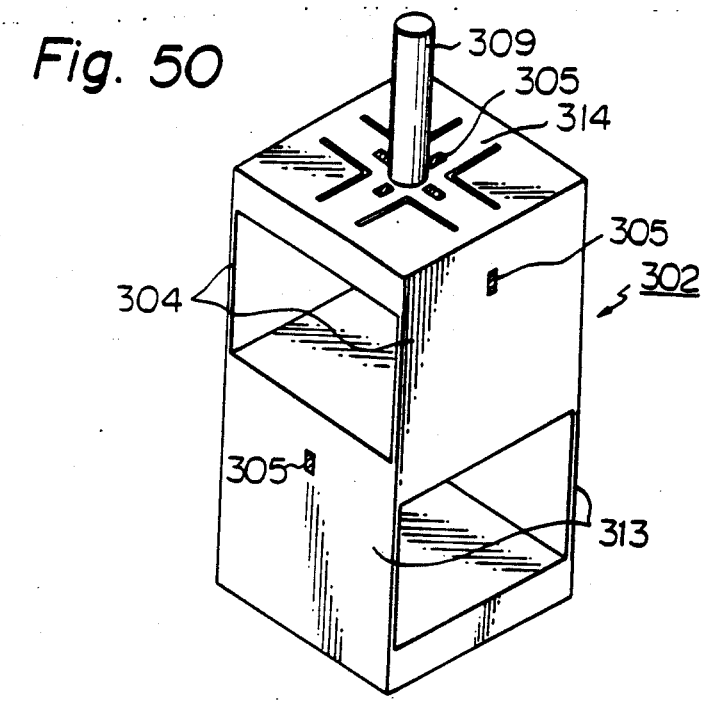
FIG. 50 is a perspective view of another example of the compliance means according to the present invention.
Figure 51:
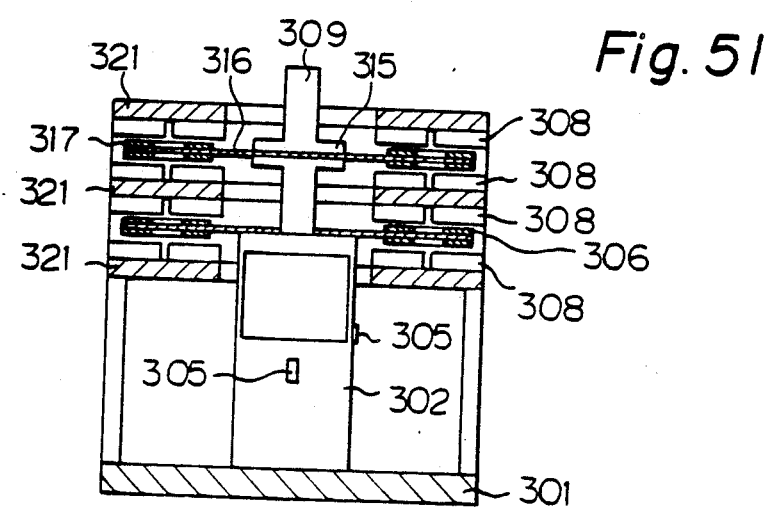
FIG. 51 is a sectional view of the wrist portion of a robot provided with the compliance means of FIG. 50.
Figure 52:
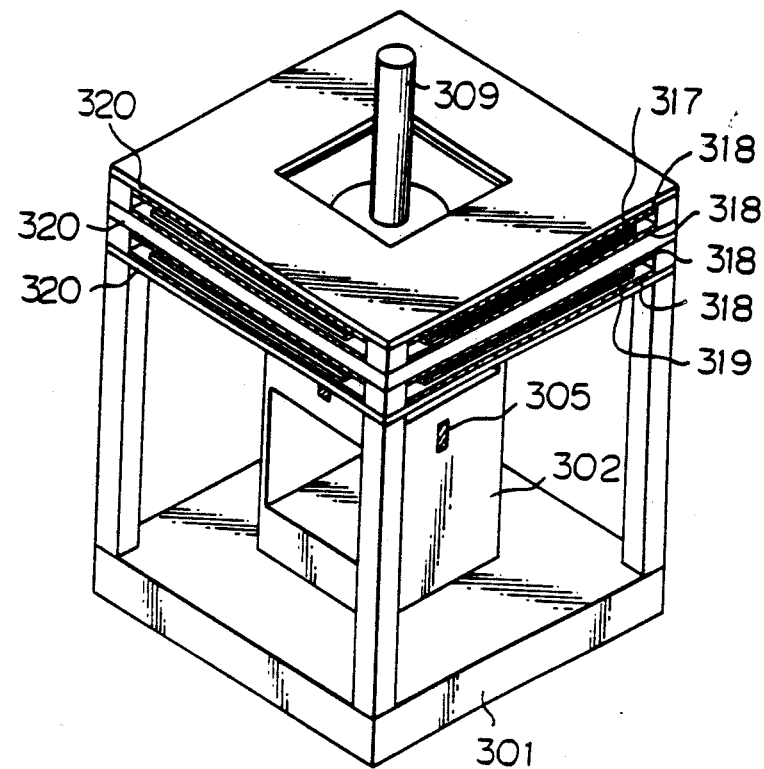
FIG. 52 is a perspective view of the wrist portion of a robot provided with the compliance means of FIG. 50.
Figure 53:
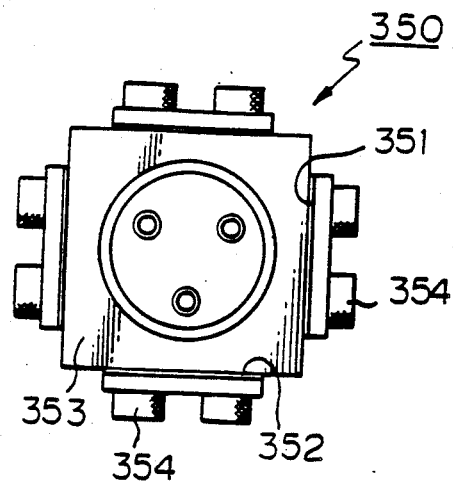
FIG. 53 is a top view of a supporting device (wrist portion of the robot) to which the compliance means according to the present invention is applied.
Figure 54:
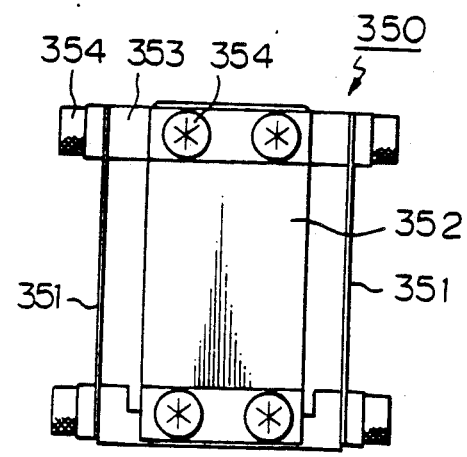
FIG. 54 is a side view of the supporting device of FIG. 53.

Another example of the compliance means which constitutes a wrist portion of the robot in accordance with the present invention is illustrated in FIG. 50. This compliance means comprises a parallel leaf spring assembly 302 and a cross-shaped leaf spring 314. The connection rod 309 can be inclined with respect to the vertical axis of the parallel leaf spring assembly by movement of the cross-shaped leaf spring 314. Therefore, the insertion operation can be achieved even if the axis of the connection rod 309 is inclined with respect to the axis of the hole into which a rod member is to be inserted. A DC planar motor for varying the compliance with respect to the inclination of the connection rod 309 is provided, in addition to the DC planar motor for varying the compliance with respect to the displacement in the direction X and the direction Y of the parallel leaf spring assembly 302. Such an additional DC planar motor is illustrated in FIGS. 51 and 52. This DC planar motor for varying the compliance with respect to the inclination of the connection rod 309 comprises a support plate 316 on which a planar coil 317 for biasing the support plate in the direction X and planar coil (not shown) for biasing the support plate in the direction Y are disposed, the plate 316 being secured to a flange 315 at the middle portion of the connection rod 309 and to magnets 308 disposed above and beneath the support plate 316. The connection rod 309 can be inclined in any direction by actuating the DC planar motor in the direction X and the direction Y. Therefore, it is possible to vary the compliance with respect to the inclination of the connection rod 309. Strain gauges 305 for detecting deformation of the cross-shaped leaf spring are attached thereto in the vicinity of the center thereof where maximum deformation can be detected. The DC planar motor is controlled in a manner similar to that of the former example.

As was mentioned above, in accordance with the present invention, the wrist portion of the robot comprises a variable compliance means so that an optimum compliance can be obtained in accordance with the movement of the robot. The robot can, therefore, smoothly and similarly manipulate both light members and heavy members without using a position control means of a high accuracy. The compliance can be decreased so that the spring can be stiffened during a rapid movement of the robot, such as in the conveying operation, which can be detected by strain gauges as a displacement of a high frequency of the wrist portion of the robot. On the other hand, the compliance can be increased so that the spring can be softened during a slow movement of the robot, such as in the assembling operation, which can be detected by strain gauges as a displacement of a low frequency of the wrist portion of the robot. Therefore, various operations, such as an insertion operation, can be achieved smoothly and at a high speed.

The application of the compliance means of the present invention is not limited to the wrist of a robot. The compliance means can be applied to the afore-mentioned paper feed apparatus so that the springy force of the springy means which holds the paper is changed in response to the movement or situation thereof. The paper feed apparatus provided with the variable compliance means can deal with various types of papers by changing the springy force by changing the sign of the positional feed back gain $A_1$.

Also, the variable compliance means can be applied to the robot for manufacturing magnetic heads or record player arms. In this case, the springy force is increased when the parts are conveyed at a high speed, while the springy force is decreased when the parts are assembled at a low speed so as to avoid damage of the parts.

Another example of a variable compliance means which comprises another type of parallel leaf spring assembly is illustrated in FIG. 53 to FIG. 59. The parallel leaf spring assembly 350 of this example is similar in shape to that of FIG. 26. Two pairs of leaf springs 351 and 352 are secured with screws 354 to a connection member 353 at the upper end of each leaf spring. This type of parallel leaf spring assembly is shorter in height than the afore-mentioned examples. It is, therefore, possible to make the robot wrist small in size and to uniformly control the movement of each spring.

Figure 55:
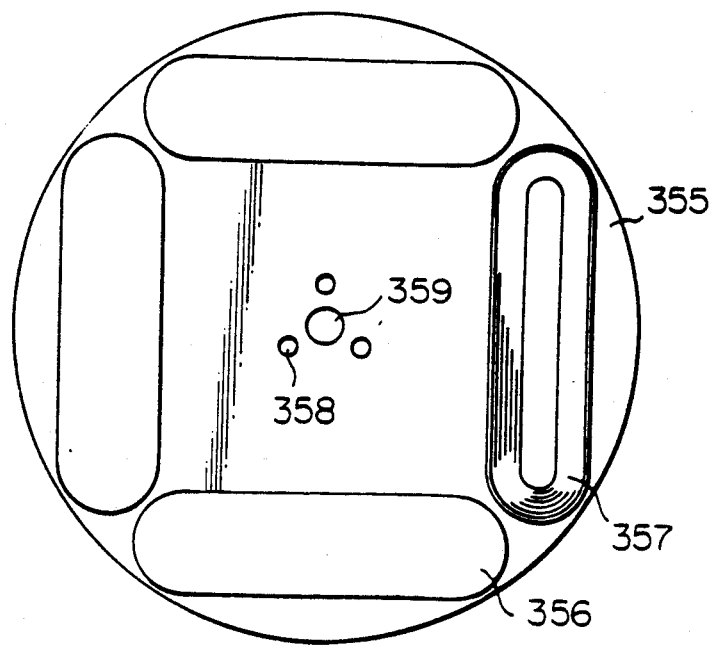
FIG. 55 is a plan view of a biasing means according to the present invention.
Figure 56:
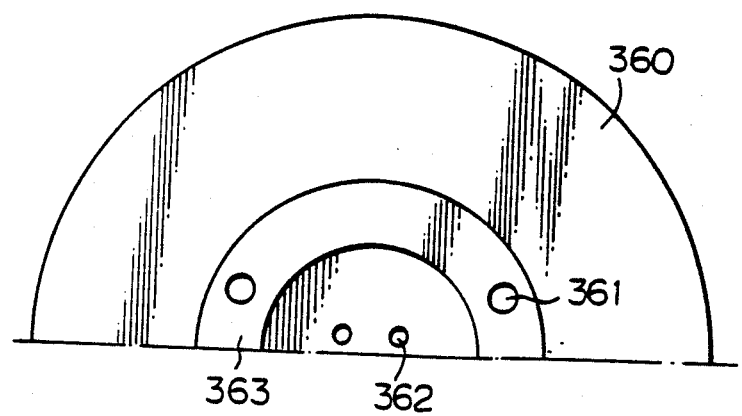
FIG. 56 is a top view of a holder according to the present invention.
Figure 57:
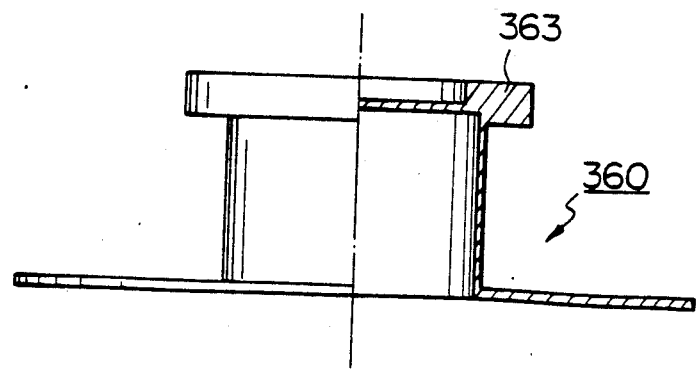
FIG. 57 is a side view and a partial sectional view of the holder of FIG. 56.

A DC planar coil which constitutes a biasing means for varying the compliance of the parallel leaf spring assembly is illustrated in FIG. 55. Recesses 356 are formed in a disc 355 of nonmagnetic material. A planar coil 357 is disposed in each of the recesses 356, though only one coil 357 is illustrated in the drawing. The disc 355 is attached to the lower surface of the parallel leaf spring assembly 350 via attaching holes 358 and 359. The upper surface of the parallel leaf spring assembly 350 (FIG. 58) is attached to a holder 360 (FIGS. 56 and 57) via holes 362. The holder 360 is secured to the robot arm (not shown) via holes 361 formed on an upper flange 363 thereof. A yoke 367 and magnets 365 are disposed above the planar coils 357, and another yoke 367 is disposed below the planar coils 357, as is illustrated in the left half of FIG. 58, so that a magnetic circuit, indicated by the looped arrow, is formed. The yokes 367, the magnets 365, and the planar coils 357 on the disc 355 constitute a DC planar motor.

Figure 58:
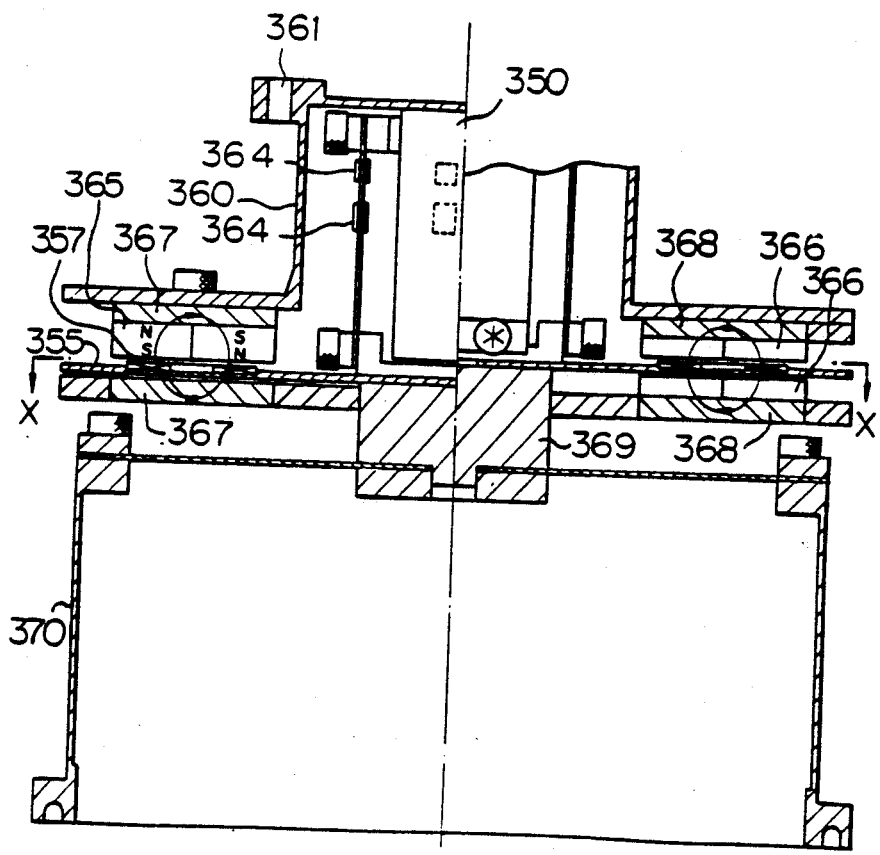
FIG. 58 is a sectional view of the wrist portion of the robot assembled with the parts of FIGS. 53 to 57.

Another DC planar motor is illustrated in the right half of FIG. 58. In this example, magnets 366 and yokes 368 are symmetrically disposed on both sides of the planar coils so that a magnetic circuit, indicated by the looped arrow, is formed. Numeral 370 designates a robot hand such as a vacuum suction device which holds the object, e.g. a magnetic disc, to be manipulated.

Figure 59:
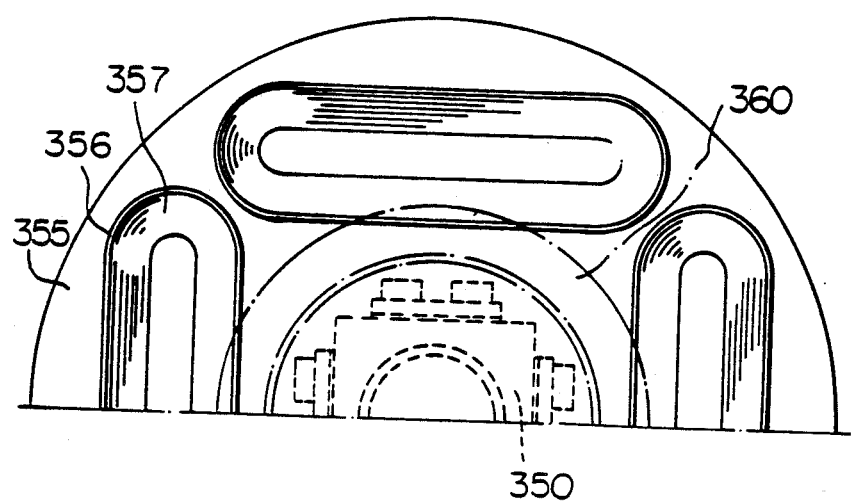
FIG. 59 is a plan view seen along the line X—X in FIG. 58.
Figure 60:
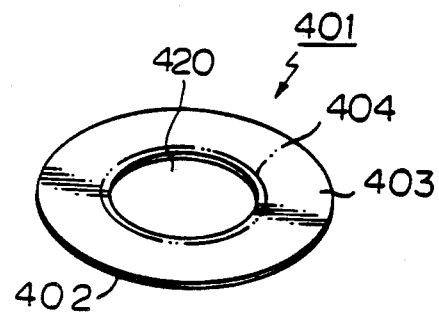
FIG. 60 is an outer view of a magnetic disc device.
Figure 61:
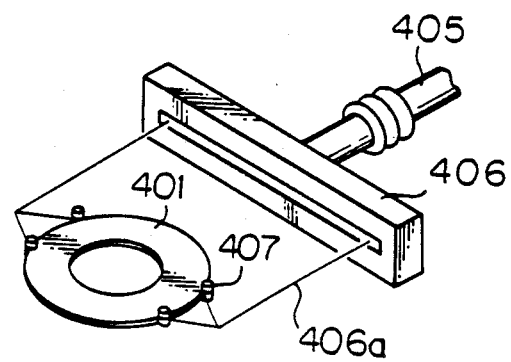
FIG. 61 is an outer view of the hand of a conventional robot for manufacturing magnetic disc devices.

A plan view of the disc 355 is illustrated in FIG. 59.

Figure 62:
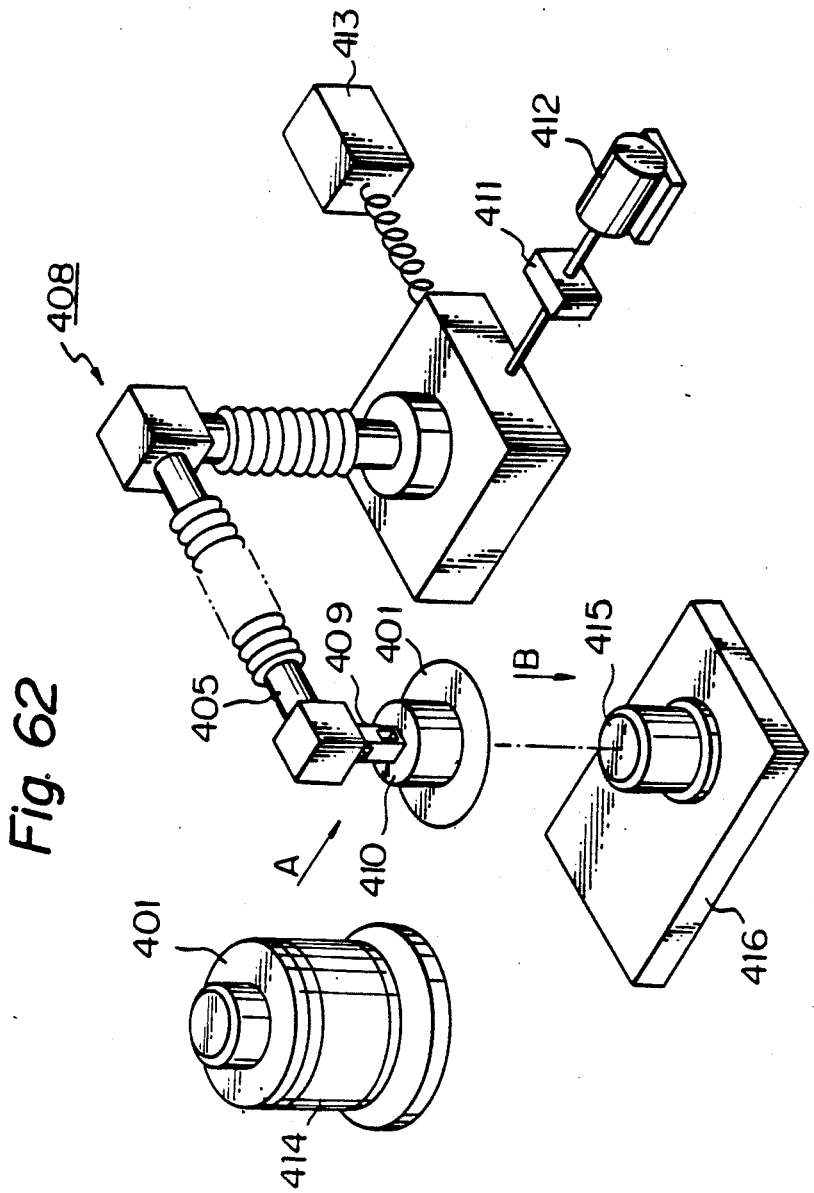
FIG. 62 is a perspective view of a robot, for manufacturing magnetic disc devices, according to the present invention.

FIG. 62 is a perspective view of a robot, in accordance with the present invention, used for assembling a magnetic disc device. A wrist 409 which comprises a mechanical compliance means is disposed at the end of an arm 405 of the robot 408. A vacuum suction device 410 is attached to the wrist 409. The vacuum suction device 410 communicates with a vacuum pump 412 through a regulator 411. Reference numeral 413 designates a control means for actuating the robot. The vacuum suction device 410 of the robot 408 picks up a magnetic disc 401 from a disc station 414, where a number of magnetic discs are stacked. The magnetic disc 401 is conveyed, as is shown by the arrow A, toward a position above a spindle 415 of a base plate 416 of the magnetic disc device. Then the magnetic disc 401 is lowered and is fitted onto the spindle 415, as is shown by the arrow B. After a predetermined number of magnetic discs 401 are disposed on the spindle 415, the base plate 416 is sealed within a case having a magnetic head (not shown) and an access means (not shown) so as to constitute a magnetic disc device (Disc Enclosure).

Figure 63:
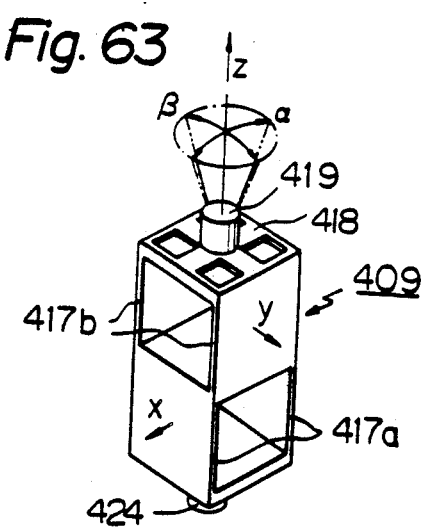
FIG. 63 is a perspective view of the wrist portion of the robot according to the present invention.
Figure 64:
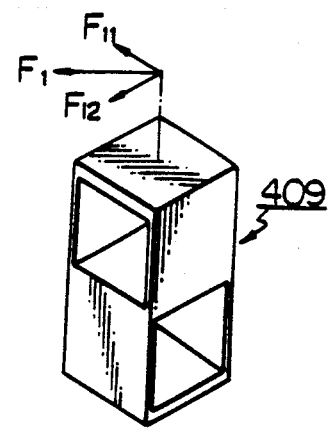
FIG. 64 is a perspective view of the parallel leaf spring assembly according to the present invention.
Figure 65:
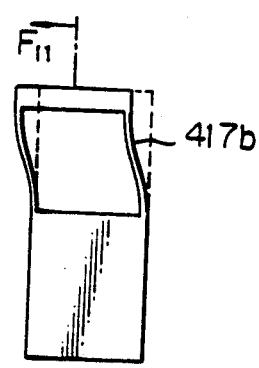
FIG. 65 is a side view of the deformed parallel leaf spring assembly of FIG. 64.
Figure 66:
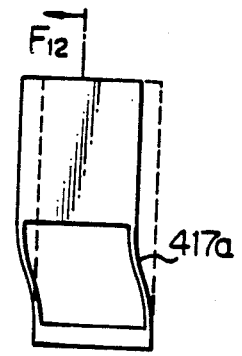
FIG. 66 is another side view of the deformed parallel leaf spring assembly of FIG. 64.

The wrist 409 of the robot 408 is illustrated in detail in FIG. 63. The wrist 409 comprises two pairs of parallel leaf springs 417a and 417b which can move in a horizontal plane in the direction X and the direction Y, which directions are perpendicular to each other, and a cross-shaped leaf spring 418 which is disposed at the upper end of the wrist 409 and which makes it possible to incline and vertically move (in the direction Z) the robot hand (vacuum suction device 410) with respect to the robot arm 405. The wrist 409 is connected to the arm 405 via the connection rod 419 and to the vacuum suction device 410 via the connection rod 424. The wrist 409 constitutes a mechanical compliance means having five degrees of freedom, i.e., two degrees of freedom in the direction X and the direction Y due to the parallel leaf springs 417a and 417b and three degrees of freedom in the direction Z and angular directions α and β due to the cross-shaped leaf spring 418. If a horizontal force $F_1$ is applied to the wrist 409, as is illustrated in FIG. 64, the force component $F_{12}$ in the direction Y is compensated for by deformation of the pair of parallel leaf springs 417b, as is illustrated in FIG. 65, and the force component $F_{12}$ in the direction X is compensated for by deformation of the pair of parallel leaf springs 417a, as is illustrated in FIG. 66. Any misalignment in the direction X and the direction Y in the insertion operation is thereby compensated for.

Figure 67:
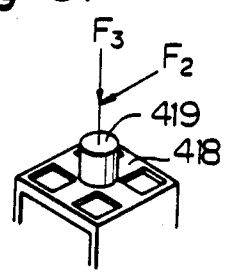
FIG. 67 is a perspective view of a cross-shaped leaf spring according to the present invention.
Figure 68:
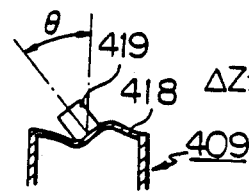
FIG. 68 is a sectional view of the cross-shaped leaf spring (diaphragm) of FIG. 67 showing a manner of deformation of the spring.

If the axis of the wrist 409 is inclined with respect to the insertion direction so that a force $F_2$ is applied to the connection rod 419 (FIG. 67), the force $F_2$ is compensated for by the cross-shaped leaf spring 418 due to the bent deformation thereof, as is illustrated in FIG. 68, so that the connection rod 419 is inclined at an angle θ with respect to the axis of the wrist 409 in accordance with the force $F_2$. Twist deformation of the leaf spring also occurs above the longitudinal axis thereof. Thereby, angular misalignment between the axis of the wrist and the axis of the hole in the insertion operation is compensated for.

Figure 69:
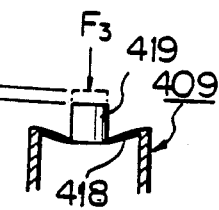
FIG. 69 is a sectional view of the cross-shaped leaf spring of FIG. 67 showing another manner of deformation of the spring.

If a vertical force $F_3$ is applied to the wrist 409, the force $F_3$ is compensated for by the cross-shaped leaf spring 418 due to the deformation thereof in the direction Z, as is illustrated in FIG. 69, so as to compensate for the error ΔZ in the vertical direction.

Figure 70:
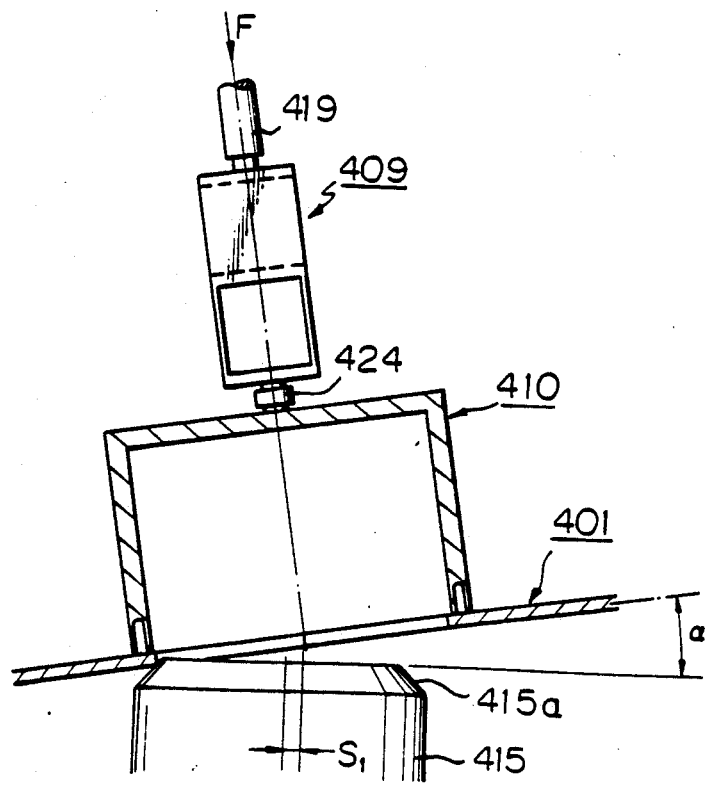
FIG. 70 shows the function of a robot according to the present invention.

When the robot comprising the above-mentioned wrist structure is used for assembling a magnetic disc device by inserting the spindle 415 into the center hole of the magnetic disc 401, if an insertion force F is applied to the wrist 409 in the condition of misalignment of $S_1$ between the center of the magnetic disc 401 and the center of the spindle 415 and angular misalignment of α between the axis of the wrist 409 and the axis of the spindle, i.e., inclination of the magnetic disc 401, as is illustrated in FIG. 70, the insertion operation can be smoothly carried out due to the compliance function of the wrist 409. As long as the inner periphery of the magnetic disc 401 is positioned above the chamfer 415a on the top of the spindle 415, the insertion force F is compensated for by the wrist 409 due to the deformation thereof, as was previously mentioned, so that the magnetic disc 401 slides down along the chamfer 415a and fits onto the spindle 415.

Figure 71:
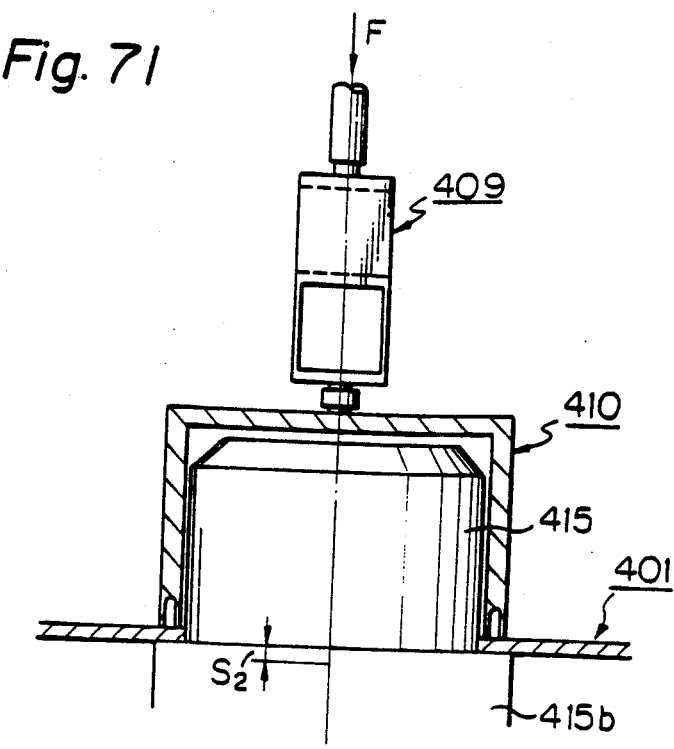
FIG. 71 also shows the function of a robot according to the present invention.

If, after the magnetic disc 401 is positioned at a predetermined place 415b, as is illustrated in FIG. 71, a further vertical force F is applied to the wrist 409, due to an error in programming the robot, so as to move the arm downward by a length $S_2$, this erroneous positioning force F can be compensated for by the movement of the cross-shaped leaf spring in the direction Z by the length $S_2$.

Figure 72:
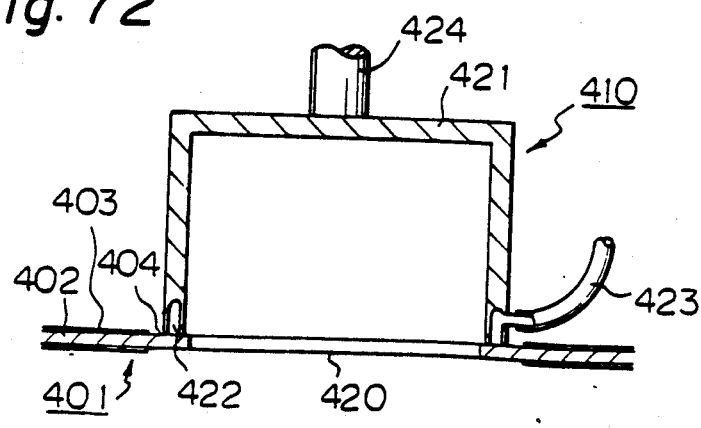
FIG. 72 is a sectional view of a vacuum suction device according to the present invention.

A vacuum suction device 410 is illustrated in detail in FIG. 72. The magnetic disc 401 comprises a flat ring plate substrate 402 on which a magnetic layer 403 is coated. The diameter of and the thickness of the cylindrical vacuum suction device 410 correspond to the size of the uncoated inner periphery 404 of the magnetic disc 401. A groove 422 is formed along the annular lower edge of the cylindrical body 421 of the vacuum suction device 410. The groove 422 serves as a sucking mouth of the vacuum suction device 410. The uncoated inner periphery 404 of the magnetic disc 401 is sucked through the groove 422 of the vacuum suction device 410. The magnetic disc 401 is thereby picked up by the vacuum suction device 410.

A vacuum-sensing means may be used in order to determine whether the magnetic disc 401 is securely held by the vacuum suction device 410. Such a vacuum-sensing means comprises a vacuum sensor 426 (FIG. 73), which communicates with the groove 422 (FIG. 72) of the vacuum suction device 410 through an elbow 423, and a T-shaped pipe 425 to which the vacuum pump 412 is connected. The vacuum pressure within the groove 422 is detected by the vacuum sensor 426.

Figure 74:
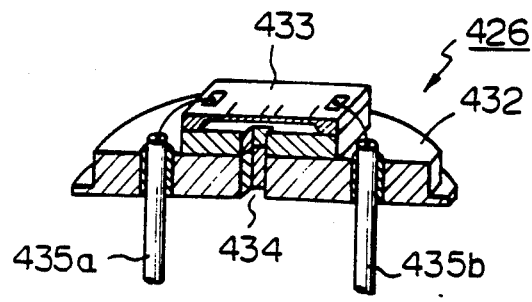
FIG. 74 is a sectional view of an example of a vacuum detector which can be applied to the present invention.

The vacuum sensor 426 may be a diaphragm-type pressure sensor, as is shown in FIG. 74. This pressure sensor comprises a diaphragm 433 of silicon disposed on a base plate 432. Resistance film is diffused on the diaphragm 433. The base plate 432 is covered by a cap (not shown) so as to form a vacuum chamber. A vacuum is introduced into the vacuum chamber through the elbow 423 and the T-shaped pipe 425. Atmospheric pressure is introduced into a space under the diaphragm 433 through a passage 434. The diaphragm 433 is deformed due to a pressure difference between the vacuum pressure which acts upon the upper surface thereof and the atmospheric pressure which acts upon the lower surface thereof. Such a deformation of the diaphragm 433 causes a change in the resistance thereof. The vacuum pressure can be detected by measuring the resistance of the diaphragm 433 between the terminals 435a and 435b. The suction force is in proportion to the vacuum pressure. Therefore, it is possible to determine whether the magnetic disc 401 is securely held by the vacuum suction device 410 by detecting the vacuum pressure within the groove 422 of the vacuum suction device 410.

Figure 73:
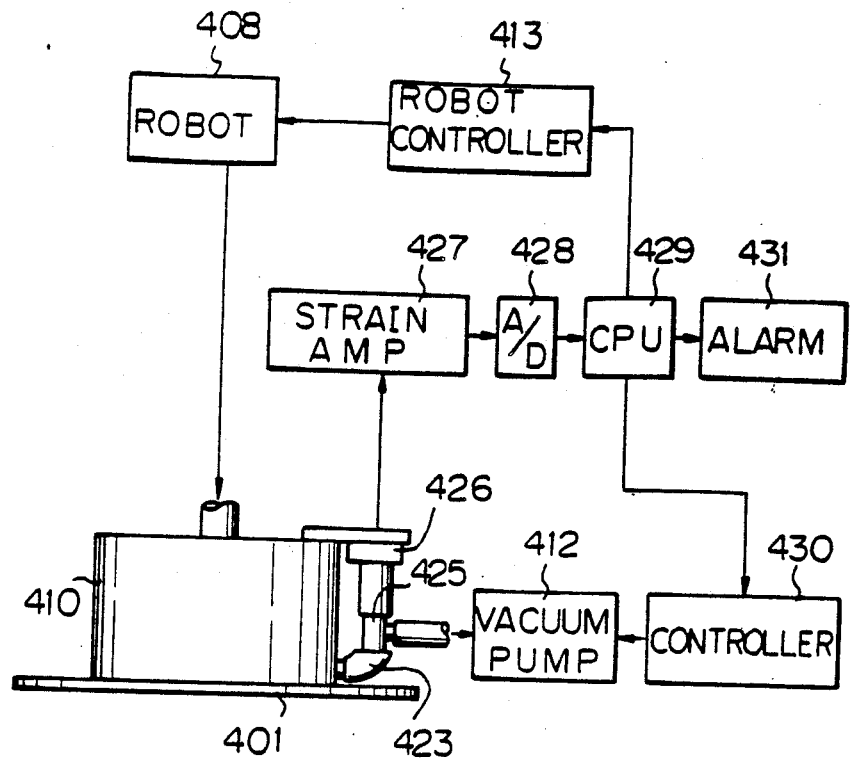
FIG. 73 is a block diagram of a unit for controlling a robot according to the present invention.

The output of the vacuum sensor 426 is amplified by a strain amplifier 427 and is introduced into the CPU 429 via an A/D converter 428, as is illustrated in FIG. 73. The CPU 429 controls the robot 408 and the vacuum pump 412 via a robot controller 413 and a vacuum pump controller 430, respectively, in accordance with the output of the vacuum sensor 426. The output of the vacuum sensor 426 is connected to an alarm means 431 via the CPU 429. With this construction, it is possible to control the robot so that it reliably holds the magnetic disc by controlling the movement of the robot arm and the vacuum pump.

As was mentioned above, in accordance with the present invention, there is provided a mechanical compliance means which makes it possible to move the robot hand relative to the robot arm in accordance with the misalignment and the relative inclination between the members to be manipulated by the robot. Therefore, the operation of inserting a rod member into a hole of a block member can be smoothly carried out even if the position of the members is roughly controlled, with the result that damage to the members is prevented and no expensive position control means of a high accuracy is necessary.

Also, in the operation of assembling the magnetic disc device, it is possible to reliably hold the magnetic disc by using a vacuum suction device as the hand of the robot without touching the magnetic layer of the magnetic disc. Therefore, the operation of assembling the magnetic disc device can be reliably controlled at a high speed.

We claim:
1. A supporting device, comprising:
a first member;
a second member;

springy means, supported by said first member, for resiliently supporting said second member, said springy means having an elasticity;

detection means, positioned on said springy means, for detecting a displacement of said springy means with respect to said first member, in accordance with the movement of said second member, and for generating a biasing signal in accordance with the detected displacement; and biasing means for applying a biasing force to said springy means to vary the elasticity of said springy means in accordance with said biasing signal, said biasing means being connected to said first and second members so that said springy means is biased, by said biasing force, with respect to said first member and so that a counterforce of said biasing force acts on said first member, said springy means comprising first and second pairs of parallel leaf springs, said first pair of parallel leaf springs supporting said second pair of parallel leaf springs so that said first and second pairs of parallel leaf springs can move perpendicularly with respect to each other in first and second directions, said supporting device supporting an article which applies a load to said supporting device in a third direction which is perpendicular to the first and second directions.

2. A supporting device as set forth in claim 1, wherein said second member comprises holder means for holding an article and wherein said first member comprises arm means for moving said holder means.

3. A supporting device as set forth in claim 1, wherein said biasing means comprises a DC planar motor having at least one planar coil connected to receive a current which varies in accordance with said biasing signal and connected to one of said first and second members, and at least one magnet connected to the other one of said first and second members and magnetically connected to said planar coil.

4. A supporting device as set forth in claim 1, wherein:

each of said first and second pairs of parallel leaf springs has first and second ends;

said second end of said first pair of leaf springs is interconnected with said first end of said second pair of leaf springs so that said first and second pairs of leaf springs can move perpendicularly with respect to each other; and said first end of said first pair of leaf springs is connected to said first member, and said second end of said second pair of leaf springs is connected to said second member.

5. A supporting device, comprising:

a first member;

a second member;

springy means, supported by said first member, for resiliently supporting said second member, said springy means including a first pair of parallel leaf springs having an upper end, a lower end and a direction of displacement, said upper end of said first pair of leaf springs being connected to said first member;

a second pair of parallel leaf springs having an upper end, a lower end, and a direction of displacement, said lower end of said second pair of leaf springs being connected to said second member, said lower end of said first pair of leaf springs supporting said upper end of said second pair of leaf springs in such a manner that the direction of displacement of said first pair of leaf springs with respect to said first member is perpendicular to the direction of displacement of said second pair of leaf springs with respect to said first member; and a cross-shaped leaf spring, positioned at said upper end of said first pair of leaf springs, for allowing said second member to incline with respect to said first member and shift said second member with respect to said first member in a direction perpendicular to the direction of displacement of said first and second pair of leaf springs.

6. A supporting device attached to a robot, comprising:

a hand, including a vacuum suction device, for holding an article;

an arm for moving said hand; and a wrist supported by said arm for supporting said hand, said wrist including a parallel leaf spring assembly having two pairs of parallel leaf springs, said pairs of parallel leaf springs moving perpendicularly with respect to each other in the direction X and the direction Y, respectively; and a cross-shaped leaf spring which enables said hand to move with respect to said arm in the direction Z perpendicular to the plane defined by the directions X and Y and to enable said hand to incline with respect to said arm.

7. A supporting device attached to a robot, comprising:

a hand for holding an article;

an arm for moving said hand; and a wrist, supported by said arm, for supporting said hand, said wrist including:

two pairs of parallel leaf springs, said two pairs of parallel leaf springs moving perpendicularly with respect to each other, each pair of parallel leaf springs having an upper end and a lower end;

a first plate, said upper end of each of said two pairs of parallel leaf springs being secured to said first plate;

second and third plates, said second plate being supported by said arm, said third plate supporting said hand, said lower end of said two pairs of parallel leaf springs being secured to said second and third plates, respectively; and limiting means, coupled to said two pairs of parallel leaf springs, for defining the range of the movement of said two pairs of parallel leaf springs.

8. A supporting device, comprising:

a first member;

a second member;

springy means, supported by said first member, for supporting said second member, said springy means including a first pair of parallel leaf springs having an upper end, a lower end and a direction of displacement, said upper end of said first pair of parallel leaf springs being connected to said first member, a second pair of parallel leaf springs having an upper end, a lower end, and a direction of displacement, said lower end of said second pair of parallel leaf springs being connected to said second member, said lower end of said first pair of parallel leaf springs supporting said upper end of said second pair of parallel leaf springs interconnected in such a manner that the direction of displacement of said first member is perpendicular to the direction of displacement of said second pair of parallel leaf springs with respect to said first member; and a cross-shaped leaf spring, positioned at said lower end of said second pair of leaf springs, for allowing said second member to incline with respect to said first member and shift said second member with respect to said first member in a direction perpendicular to the direction of displacement of said first and second pair of leaf springs.

9. A supporting device, comprising:
a first member;
a second member; and
springy means, supported by said first member, for resiliently supporting said second member, said springy means including
a plate,
a first pair of parallel leaf springs having an upper end connected to said plate, a lower end connected to said first member, and a direction of displacement, and
a second pair of parallel leaf springs having an upper end connected to said plate, a lower end connected to said second member, and a direction of displacement, said lower end of said second pair of parallel leaf springs supporting said second member and said upper end of said first pair of parallel leaf springs supporting said upper end of said second pair of parallel leaf springs in such a manner that the direction of displacement of said first pair of parallel leaf springs with respect to said first member is perpendicular to the direction of displacement of said second pair of parallel leaf springs with respect to said first member.

10. A supporting device as set forth in claim 9, wherein said springy means further comprises limiting means, coupled to said first and second pairs of parallel leaf springs, for limiting the movement of said first and second pairs of parallel leaf springs, wherein said plate has an aperture formed therein which acts as said limiting means, and wherein said supporting device further includes a rod extending through said aperture to interconnect said second member and said second pair of parallel leaf springs, so that a clearance is formed between the aperture and said rod and the movement of said second pair of parallel leaf springs with respect to said plate is limited to be within the clearance.

11. A supporting device as set forth in claim 9, wherein said second member comprises holder means for holding an article and wherein said first member comprises arm means for moving said holder means.

12. A supporting device as set forth in claim 1, wherein said springy means further comprises:
a first plate, said first and second pairs of parallel leaf springs each having upper and lower ends and a direction of displacement, said upper ends of said first and second pair of parallel leaf springs being connected to said first plate so that the direction of displacement of said first pair of parallel leaf springs is perpendicular to the direction of displacement of said second pair of parallel leaf springs; and
second and third plates, said second plate being connected to one of said first and second members and to said lower end of said first pair of parallel leaf springs, said third plate being connected to the other of said first and second members and to said lower end of said second pair of parallel leaf springs.

13. A supporting device as set forth in claim 7, wherein said hand comprises a vacuum suction device.

14. A supporting device as set forth in claim 1, wherein:
said detection means comprises a plurality of strain gauges, each strain gauge having a variable resistance;
said strain gauges constitute a bridge circuit; and
said strain gauges are positioned on said springy means.

15. A supporting device as set forth in claim 4, wherein:
said detection means comprises a plurality of strain gauges, each strain gauge having a variable resistance;
said strain gauges constitute a bridge circuit; and
said strain gauges are positioned on said first and second pairs of leaf springs.

16. A supporting device as set forth in claim 5, further comprising:
detection means, positioned on said springy means, for detecting the displacement of each pair of said parallel leaf springs with respect to each other, for detecting the displacement of the cross-shaped leaf spring, and for generating a biasing signal in accordance with the detected displacements, the biasing signal having a zero value for predetermined displacements of the parallel leaf springs and the cross-shaped leaf spring; and
means, connected to the detection means, for shifting said first member toward a position where the value of the biasing signal is zero.

17. A supporting device as set forth in claim 7, further comprising:
detection means, positioned on said wrist, for detecting the displacement of each pair of said parallel leaf springs with respect to each other, and for generating a biasing signal in accordance with the detected displacements, the biasing signal having a zero value for a predetermined displacement of the parallel leaf springs; and
means, connected to the detection means, for shifting said first member toward a position where the value of the biasing signal is zero.

18. A supporting device as set forth in claim 8, further comprising:
detection means, positioned on said springy means, for detecting the displacement of each pair of said parallel leaf springs with respect to each other, for detecting the displacement of the cross-shaped leaf spring, and for generating a biasing signal in accordance with the detected displacement, the biasing signal having a zero value for predetermined displacements of the parallel leaf springs and the cross-shaped leaf spring; and
means, connected to the detection means, for shifting said first member toward a position where the value of the biasing signal is zero.

19. A supporting device as set forth in claim 9, further comprising:
detection means, positioned on said springy means, for detecting the displacement of each pair of said parallel leaf springs with respect to each other, and for generating a biasing signal in accordance with the detected displacements, the biasing signal having a zero value for a predetermined displacement of the parallel leaf springs; and means, connected to the detection means, for shifting said first member toward a position where the value of the biasing signal is zero.

20. A supporting device as set forth in claim 1, wherein:
said springy means further comprises a cross-shaped leaf spring for enabling said second member to move with respect to said first member in a direction perpendicular to the plane defined by the first and second directions and for enabling said second member to incline with respect to said first member;
said detection means comprises a plurality of strain gauges each having a variable resistance; and
said strain gauges constitute a bridge circuit; and
said strain gauges are positioned on said first and second pairs of leaf springs and said cross-shaped leaf spring.

21. A supporting device as set forth in claim 7, wherein said first plate has a hole having a diameter formed therein which acts as said limiting means, wherein said arm extends through said hole, and wherein the range of movement of said two pairs of parallel leaf springs is defined by the diameter of said hole.

22. A supporting device, comprising:
a first member;
a second member;
springy means, supported by said first member, for resiliently supporting said second member, said springy means having an elasticity and an inherent spring constant;
detection means, positioned on said springy means, for detecting a displacement of said springy means with respect to said first member, in accordance with the movement of said second member, and for generating a biasing signal in accordance with the detected displacement; and
biasing means for applying a biasing force to said springy means, said biasing means being secured to said first member and applying a force to said second member to move with respect to said first member, thereby applying said biasing force to said springy means, said biasing force being applied in the same direction as the movement of said second member, to produce a spring constant for said springy means which is less than the inherent spring constant and to soften the elasticity of said springy means in accordance with the biasing signal.

23. A supporting device, comprising:
a first member;
a second member;
springy means, supported by said first member, for resiliently supporting said second member, said springy means having an elasticity and an inherent spring constant;
detection means, positioned on said springy means, for detecting a displacement of said springy means with respect to said first member, in accordance with the movement of said second member, and for generating a biasing signal in accordance with the detected displacement; and biasing means for applying a biasing force to said springy means to vary the elasticity of said springy means in accordance with the biasing signal by producing a spring constant for said springy means which is greater than or less than the inherent spring constant, said biasing means being secured to said first member and applying a force to said second member to move with respect to said first member, thereby applying said biasing force to said springy means, the direction of the biasing force being changeable so that the direction is the same as, or opposite to, that of the movement of said second member.

24. A supporting device as set forth in claim 22, wherein:
said springy means comprises first and second pairs of parallel leaf springs, each of said first and second pairs of parallel leaf springs having first and second ends;
said second end of said first pair of parallel leaf springs is interconnected with said first end of said second pair of parallel leaf springs, so that said first and second pairs of parallel leaf springs can move perpendicularly with respect to each other; and
said first end of said first pair of parallel leaf springs is connected to said first member, and said second end of said second pair of parallel leaf springs is connected to said second member.

25. A supporting device as set forth in claim 23, wherein:
said springy means comprises first and second pairs of parallel leaf springs, each of said first and second pairs of parallel leaf springs having first and second ends;
said second end of said first pair of parallel leaf springs is interconnected with said first end of said second pair of parallel leaf springs, so that said first and second pairs of parallel leaf springs can move perpendicularly with respect to each other; and
said first end of said first pair of parallel leaf springs is connected to said first member, and said second end of said second pair of parallel leaf springs is connected to said second member.

26. A supporting device as set forth in claim 22, wherein:
said detection means comprises a plurality of strain gauges, each strain gauge having a variable resistance;
said strain gauges constitute a bridge circuit; and
said strain gauges are positioned on said springy means.

27. A supporting device as set forth in claim 23, wherein:
said detection means comprises a plurality of strain gauges, each strain gauge having a variable resistance;
said strain gauges constitute a bridge circuit; and
said strain gauges are positioned on said springy means.

28. A supporting device as set forth in claim 22, wherein:
said biasing means comprises a DC planar motor having at least one planar coil connected to receive a current which varies in accordance with the biasing signal and connected to one of said first and second members, and at least one magnet connected to the other one of said first and second members and magnetically connected to said planar coil.

29. A supporting device as set forth in claim 23, wherein:
said biasing means comprises a DC planar motor having at least one planar coil connected to receive a current which varies in accordance with the biasing signal and connected to one of said first and second members, and at least one magnet connected to the other one of said first and second members and magnetically connected to said planar coil.

30. A supporting device as set forth in claim 19, wherein said shifting means is an arm and said second member is a hand member for holding an article.

31. A supporting device as set forth in claim 9, wherein said plate is a first plate and wherein said springy means further comprises second and third plates, said second plate being supported by said first member, said third plate supporting said second member, and said lower ends of said first and second pairs of parallel leaf springs being secured to said second and third plates, respectively, said second and third plates having recesses which face each other, so that one of said second and third plates is received within the recess of the other of said second and third plates, said recesses forming a limiting means for defining a range of movement of said first and second pairs of parallel leaf springs.

32. A supporting device as set forth in claim 18, wherein said shifting means is an arm and said second member is a hand member for holding an article.

33. A supporting device as set forth in claim 23, wherein said first member is an arm of the robot and said second member is a hand of the robot, wherein said biasing means applies a force to said springy means in the direction opposite to the direction of the displacement of said springy means to reduce the elasticity of said springy means when said hand is conveying an article, and wherein said biasing means applies a force to said springy means in the same direction as the direction of the displacement of said springy means to increase the elasticity of said springy means when said hand is performing an assembly operation using the article.

34. A supporting device as set forth in claim 33, wherein:
said biasing means produces a current which varies in accordance with the biasing signal; and
said biasing means comprises a DC planar motor having at least one planar coil connected to receive the current which varies in accordance with the biasing signal and connected to one of said first and second members, and at least one magnet connected to the other one of said first and second members and magnetically connected to said planar coil.

* * * * *